United States Patent
Daw et al.

(10) Patent No.: US 11,729,062 B1
(45) Date of Patent: Aug. 15, 2023

(54) CONTEXT-SENSITIVE DEFRAGMENTATION AND AGGREGATION OF CONTAINERIZED WORKLOADS RUNNING ON EDGE DEVICES

(71) Applicant: VMWARE, INC., Palo Alto, CA (US)

(72) Inventors: Nilanjan Daw, Bangalore (IN); Sairam Veeraswamy, Coimbatore (IN); Raunak Ravindra Singwi, Pune (IN); Erol Aygar, Maynard, MA (US)

(73) Assignee: VMware, Inc., Palo Alto, CA (US)

(*) Notice: Subject to any disclaimer, the term of this patent is extended or adjusted under 35 U.S.C. 154(b) by 0 days.

(21) Appl. No.: 17/944,221

(22) Filed: Sep. 14, 2022

(51) Int. Cl.
  *G06F 15/173* (2006.01)
  *H04L 41/0897* (2022.01)
  *H04L 41/40* (2022.01)

(52) U.S. Cl.
  CPC .......... *H04L 41/0897* (2022.05); *H04L 41/40* (2022.05)

(58) Field of Classification Search
  CPC ........................... H04L 41/0897; H04L 41/40
  USPC ....................................................... 709/224
  See application file for complete search history.

(56) References Cited

U.S. PATENT DOCUMENTS

2017/0083566 A1* 3/2017 Das ................... G06F 16/24554
2020/0007414 A1* 1/2020 Smith .................... G06Q 30/08
2020/0167205 A1* 5/2020 Guim Bernat ........ H04L 9/3213
2022/0035678 A1* 2/2022 Yang ...................... G06F 9/5038
2023/0021883 A1* 1/2023 Aguilera ............. G06F 12/1009

FOREIGN PATENT DOCUMENTS

WO   WO-2019016584 A1 * 1/2019 ......... G06F 9/44505

* cited by examiner

*Primary Examiner* — Hee Soo Kim

(74) *Attorney, Agent, or Firm* — Barta, Jones & Foley, PLLC

(57) ABSTRACT

Computer-implemented methods, media, and systems for context-sensitive defragmentation and aggregation of containerized workloads running on edge devices are disclosed. One example method includes monitoring telemetry data from multiple software defined wide area network (SD-WAN) edge devices that run multiple workloads, where the telemetry data includes at least one of resource utilization at the multiple SD-WAN edge devices, inter-workload trigger dependency, or inter-workload data dependency among the multiple workloads. It is determined, based on the telemetry data, that at least two of the multiple workloads running on at least two SD-WAN edge devices have the inter-workload trigger dependency or the inter-workload data dependency. In response to the determination that the at least two of the multiple workloads have the inter-workload trigger dependency or the inter-workload data dependency, a first process of migrating the at least two of the multiple workloads to a first SD-WAN edge device of is initiated.

20 Claims, 13 Drawing Sheets

1100

1102
Monitor Telemetry Data from Multiple SD-WAN Edge Devices that Run Multiple Workloads, where the Telemetry Data Includes AT Least One of Resource Utilization at the Multiple SD-WAN Edge Devices, Inter-Workload Trigger Dependency Among the Multiple Workloads, or Inter-Workload Data Dependency Among the Multiple Workloads 1104
Determine, Based on the Telemetry Data, that AT Least Two of the Multiple Workloads Running on AT Least Two SD-WAN Edge Devices of the Multiple SD-WAN Edge Devices have the Inter-Workload Trigger Dependency or the Inter-Workload Data Dependency 1106
In Response to Determining that the At Least Two of the Multiple Workloads have the Inter-Workload Trigger Dependency or the Inter-Workload Data Dependency, Initiate a First Process of Migrating the At Least Two of the Multiple Workloads to a First SD-WAN Edge Device of the Multiple SD-WAN Edge Devices

US 11,729,062 B1

CONTEXT-SENSITIVE DEFRAGMENTATION AND AGGREGATION OF CONTAINERIZED WORKLOADS RUNNING ON EDGE DEVICES

RELATED APPLICATIONS

Benefit is claimed under 35 U.S.C. 119(a)-(d) to Foreign Application Serial No. 202241042680 filed in India entitled "CONTEXT-SENSITIVE DEFRAGMENTATION AND AGGREGATION OF CONTAINERIZED WORKLOADS RUNNING ON EDGE DEVICES", on Jul. 26, 2022, by VMware, Inc., which is herein incorporated in its entirety by reference for all purposes.

TECHNICAL FIELD

The present disclosure relates to computer-implemented methods, media, and systems for context-sensitive defragmentation and aggregation of containerized workloads running on edge devices.

BACKGROUND

Edge is a distributed digital infrastructure for running workloads across a multitude of locations, placed close to users and devices producing and consuming data. Edge infrastructure solutions covering a broad spectrum of domains, for example, retail, healthcare, government, manufacturing, and telecommunication, can be used to address edge computing needs in many areas. The workloads running on an edge device in an edge can be containerized workloads that are applications running on a container orchestration platform that enables the automation of much of the operational effort required to run containers having workloads and services. This operational effort includes a wide range of things needed to manage a container's lifecycle, including, but not limited to, provisioning, deployment, scaling (up and down), networking, and load balancing. Containerized workloads can include a collection of one or more related applications packaged into one or more containers that can be deployed as a unit on a single edge device or multiple edge devices based on the context defined in a manifest for the containerized workloads.

Software Defined Wide Area Network (SD-WAN) is the application of software based network technologies that virtualize wide area network (WAN) connections. It decouples network software services from underlying hardware to create a virtualized network overlay and enables the connection of users to applications. Proliferation of SD-WAN fabric across enterprise, for example, from branch office to mobile endpoints, presents a foundation platform to overlay edge infrastructure solutions to enable users to opportunistically move the performance and cost sensitive workloads to edge devices. This can result in savings in operating expenses (OpEx) and improve the resulting return on investment (RoI).

Overlaying edge infrastructure solutions on SD-WAN fabric involves many interdependent steps in order to securely deploy containerized workloads on SD-WAN edge devices. Manually driving all these steps can be laborious, error prone and often results in less effective deployment of workloads on edge devices.

SUMMARY

The present disclosure involves computer-implemented method, media, and system for context-sensitive defragmentation and aggregation of containerized workloads running on edge devices. One example computer-implemented method includes monitoring telemetry data from multiple SD-WAN edge devices that run multiple workloads, where the telemetry data includes at least one of resource utilization at the multiple SD-WAN edge devices, inter-workload trigger dependency among the multiple workloads, or inter-workload data dependency among the multiple workloads, where the inter-workload trigger dependency includes a dependency between a first pair of workloads of the multiple workloads where one of the first pair of workloads triggers another workload of the first pair of workloads, and the inter-workload data dependency includes a dependency between a second pair of workloads of the multiple workloads where an exit state context of one of the second pair of workloads is ingested by another workload of the second pair of workloads. It is determined, based on the telemetry data, that at least two of the multiple workloads running on at least two SD-WAN edge devices of the multiple SD-WAN edge devices have the inter-workload trigger dependency or the inter-workload data dependency. In response to the determination that the at least two of the multiple workloads have the inter-workload trigger dependency or the inter-workload data dependency, a first process of migrating the at least two of the multiple workloads to a first SD-WAN edge device of the multiple SD-WAN edge devices is initiated.

While generally described as computer-implemented software embodied on tangible media that processes and transforms the respective data, some or all of the aspects may be computer-implemented methods or further included in respective systems or other devices for performing this described functionality. The details of these and other aspects and implementations of the present disclosure are set forth in the accompanying drawings and the description below. Other features, objects, and advantages of the disclosure will be apparent from the description and drawings, and from the claims.

DETAILED DESCRIPTION

A SD-WAN network can have components such as SD-WAN edge, SD-WAN gateway, SD-WAN orchestrator, and SD-WAN controller. A SD-WAN edge can be a physical or virtual network function placed at an organization's branch, regional, or central office site, data center, and in public or private cloud platforms. A SD-WAN gateways can provide access to SD-WAN service in order to shorten the distance to cloud-based services or the user, and reduce service interruptions. A SD-WAN orchestrator can be a cloud hosted or on-premises web management tool that allows configuration, provisioning and other functions when operating a SD-WAN network. It can simplify application traffic management by allowing central implementation of an organization's business policies. The SD-WAN controller functionality, which can be placed in the orchestrator or in a SD-WAN Gateway, can be used to make forwarding decisions for application flows. A SD-WAN edge device can be a device in the SD-WAN edge. It can run workloads or applications, and can be installed on a home network, at a branch site, or at a data center as a hub.

Steps involved in overlaying edge infrastructure solutions on SD-WAN fabric for secured deployment of containerized workloads on edge devices can include: a) discovery of edges having edge devices that can source spare resources, b) bootstrapping container orchestration platform runtime on the edges, c) securely onboarding the edges onto SD-WAN fabric, d) secure and context aware deployment of containerized workloads on the edges, e) monitoring status of resources and service level agreement (SLA) for the containerized workloads, and f) failing over and load balancing of the containerized workloads when SLA breach occurs, in order to maintain continuous availability of the containerized workloads.

This disclosure describes technologies for context-sensitive defragmentation and aggregation of containerized workloads running on edge devices. In some implementations, pre-deployment context elements of an edge device are validated and verified to ensure that the edge device can run the containerized workloads. Security infrastructure is set up to secure the workloads according to the manifest defined for the workload container. Post-deployment checks are performed to ensure that the deployed workloads are running as expected. Workload and system context elements are continually monitored to ensure that committed context level service level agreements (SLAs) are delivered.

Figure 1:
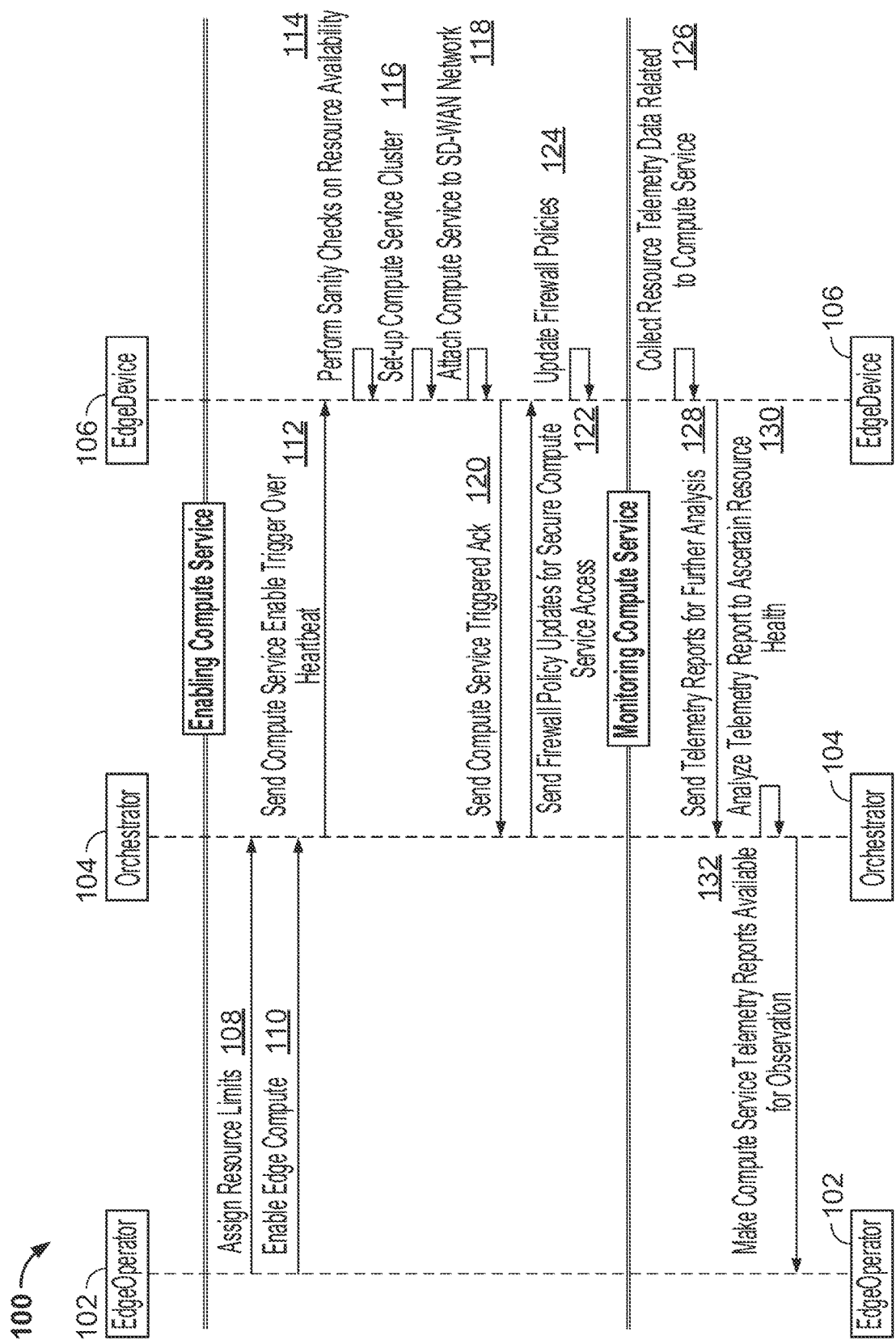
FIG. 1 illustrates an example flow for automating secured deployment of containerized workloads on edge devices, in accordance with example implementations of this disclosure.

FIG. 1 illustrates an example flow 100 for automating secured deployment of containerized workloads on edge devices, in accordance with example implementations of this disclosure. Example flow 100 can include the following steps.

At 108, a user, for example, edge operator 102, assigns the available resource quotas for the compute infrastructure on edge device 106 via a user interface (UI) of a remote manager, such as orchestrator 104. In some implementations, edge device 106 can be a software defined wide area network (SD-WAN) edge device. Orchestrator 104 can be a SD-WAN orchestrator. These quotas can consist of memory and central processing unit (CPU) limits and bandwidth (BW) allocations along with accelerator support to be assigned to a compute service at edge device 106. A compute service can be used to store states of a workload and schedule the workload on a SD-WAN edge device.

At 110, edge operator 102 instructs orchestrator 104 to enable the compute service at edge device 106.

At 112, a compute service enable trigger is sent from orchestrator 104 to edge device 106 using a heartbeat mechanism to enable the compute service at edge device 106. In some implementations, the heartbeat mechanism includes message sharing between the orchestrator and edge device 106 at a predefined frequency. For example, every T seconds, edge device 106 exchanges its current state to orchestrator 104 for the current state to be synchronized between edge device 106 and orchestrator 104. This mechanism can be done in both directions (e.g., pull and push mechanisms). The assignment of resource quotas can be done at the profile level, where all edge devices assigned the same profile are assigned the same resource limits. These limits are then communicated to all edge devices using the heartbeat mechanism.

At 114, edge device 106 performs pre-deployment sanity checks to confirm the availability of the assigned resources, taking into considerations the resource requirements of the SD-WAN core services performed at edge device 106. In some implementations, the sanity checks can include: a) precondition checks to ensure the underlying SD-WAN hardware supports the edge compute infrastructure; b) precondition checks to ensure buffer resource availability for SD-WAN network function virtualization (NFV) above the assigned resource quotas; c) precondition checks to ensure accelerator availability, if accelerator is required; and d) precondition checks to ensure library and infrastructure support for edge device 106.

At 116, after the pre-deployment sanity checks, security constructs are set up to isolate the SD-WAN network functions (NFs) from the compute service at edge device 106 to ensure both resource and namespace isolation between the SD-WAN core processes and the workload processes at edge device 106. In some implementations, security constructs can include one or more of transport layer security (TLS) certificates, TLS keys, firewall settings, network address translation (NAT) parameters, internet protocol (IP) values, egress parameters, ingress parameters, or definitions for authorization or authentication data flows. Security constructs can be accessed by both edge device 106 and orchestrator 104, and can be set up during compute service cluster configuration. A container orchestration platform, for example, Kubernetes™ (k8s), based managed compute infrastructure can be set up at edge device 106 to handle workload lifecycle management.

At 118, the compute service at edge device 106 is attached to a SD-WAN network. In some implementations, the infrastructure associated with the container orchestration platform is attached to the SD-WAN network to allow traffic routing via the SD-WAN core network to the compute service. A network enabler that includes physical hardware, operating system, and other software can be formed. The network enabler can let edge operator 102 specify network topologies from orchestrator 104. By using orchestrator 104, edge operator 102 can configure network topologies and overlays (e.g., SD-WAN) of their choice. By exposing IP values, ports, ranges, firewall parameters, and NAT settings to the compute service and workloads running within containers, the compute service can access and be accessed within the SD-WAN network.

At 120, a compute service triggered acknowledgement is sent from edge device 106 to orchestrator 104.

At 122, firewall policy updates is sent from orchestrator 104 to edge device 106 for secure access to the compute service. In some implementations, security policies can be set up at edge device 106 to ensure network isolation between the SD-WAN core service network payloads and the network data for the compute service. Further, security system policies can be set up to allow secured policy-managed requests to reach the compute service.

At 124, firewall policies are updated at edge device 106.

At 126, once the compute service has been set up, a management daemon (MGD) at edge device 106 collects telemetry data related to the health of the compute service.

At 128, the telemetry data is transported back, using the heartbeat mechanism, to orchestrator 104 for further analysis.

At 130, the health of the compute service is continuously monitored through analysis of the telemetry data to ascertain resource health. In some implementations, in case of policy violations or degradation of the edge compute service's health, remediation steps can be taken, as discussed in subsequent portions of this disclosure.

At 132, relevant telemetry reports are made available to edge operator 102 via the UI of orchestrator 104.

In some implementations, containerized workloads are orchestrated across a cohesive collection of single node clusters organized around the namespace model of a container orchestration platform such as Kubernetes™. Each cluster can include a SD-WAN edge device as the single node in the cluster. The workload orchestration can include one or more of placement, load balancing, or failover of the containerized workloads, and can include meta scheduling of the containerized workloads.

In some implementations, the meta scheduling of containerized workloads are based on one or more context elements. These context elements can be associated with applications in different domains such as retail, healthcare, government, manufacturing, and telecommunication, and they can be tuned by a user of the containerized workloads. An application manifest can specify or provide advisories on one or more of the context elements to be considered for placing the containerized workloads, and a meta-scheduler can apply a set of methods to drive the workload placement decisions. Some example context elements are described below.

Tenancy groups: Tenancy groups refer to workload groups or members belonging to the same enterprise. In some implementations, co-tenant workloads perform better if collocated. On the other hand, such collocation can be used to establish business policy boundaries.

Data and workload sovereignty: Data and workload sovereignty refers to regulatory requirements for data and execution context locations to be geographically restricted to servers within certain predefined locations. The meta-scheduler can follow such regulatory requirements while scheduling workloads across geographies.

Compliance: Workloads handling sensitive data can have compliance requirements around their execution contexts, and are serviceable by a subset of servers. The meta-scheduler can follow such compliance requirements and schedule workloads accordingly.

Resource capacity: Requirements for resource capacity such as compute, network, bandwidth, and storage are constraints that the meta-scheduler can track as metrics while scheduling workloads to fulfill quality of service (QoS) requirements.

Cost: Different hardware architectures can have different costs or different purposes. For example, while some network architectures are primed for bulk transfers at lower costs albeit at a slower rate, other network architectures are primed for low-latency high-speed transfers at higher costs. Misplacing workloads in such scenarios can lead to cost escalation without performance improvement.

Runtime hardware resource dependency: Applications can employ a host of special hardware such as accelerators and field programmable gate arrays (FPGAs) to work efficiently. For example, machine learning model trainings can be performed on discrete GPUs while inference can be done on accelerators such as tensor processing units (TPUs). The meta-scheduler can recognize workload hardware resource requirements while scheduling workloads.

Runtime data sources: Applications can data dependent. While some applications require a small amount of data, other applications such as video analytics ingest large data blocks. Scheduling such workloads closer to the source of data can lead to improved performance. It can also safeguard data on the fly and help meeting compliance requirements.

Topological proximity of other dependent clusters and application services: Workloads belonging to the same application service often display data dependency and trigger dependency. Placing them closer to each other can improve performance by reducing trigger and data transfer latencies.

Proximity to clients or consumers of the containerized workloads: Some applications such as online gaming are latency sensitive. Datacenter-based workload deployment models may not cater to these applications. Instead, workloads can be scheduled geographically closer to their consumers to address latency issues of these applications.

Fault tolerance policies applied on the clusters: Different clusters can have different fault tolerance policies, some being stricter than others allowing lower number of constituent nodes to fail before declaring the cluster as unstable. Fault tolerance policies can cater to different types of faults, for example, byzantine vs fail-stop. The meta-scheduler can recognize such fault tolerance policies before scheduling workloads.

Business drives: Business requirements such as cost optimizations can drive workload placement and the meta-scheduler can recognize such requirements.

Cluster partition policies: Cluster partition policies can be used to handle a service group, for example, a group of dependent services that are started, stopped, and failed over as a cohesive group to a same target edge, by scheduling during bootstrap and failover to cater to load balancing needs of the group of dependent services.

Time of day: Workload usage patterns can change based on the time of the day and move geographically either with or against the sun. Workloads in such cases can be continually migrated with the time of the day in order to be deployed closer to the area of usage.

Runtime SLA requirements of the application: Customer requirements can translate to different SLAs such as effective service performance (for CPU, memory, and round-trip-time), execution cost (for cost of compute and network bandwidth), and availability (for deployment target configurations that support redundancy and failover within the tolerance window) which the meta-scheduler can recognize while scheduling.

Sustainability: Datacenters can consumer a large amount of power. While some datacenters have been migrated to use alternative green energies, other datacenters rely on traditional sources of power. Favoring sustainable datacenters over others while scheduling can help reduce workload carbon footprints.

Government Regulations: Government regulations can guide workload deployment locations based on security and regulatory requirements.

Availability: Different clusters can have different fault tolerance policies, some being stricter than others allowing lower number of constituent nodes to fail before declaring the cluster as unstable. Fault tolerance policies can cater to different types of faults, for example, byzantine vs fail-stop. The meta-scheduler can recognize such fault tolerance policies before scheduling workloads.

Granular security: Security can be a high priority across workloads, and can be related to keeping workload execution context and data secure and private. However, different workloads can have different security requirements. For example, a workload handling sensitive data can be handled on secure nodes. Granular security can allow customers to define fine-grained security for their workloads which the meta-scheduler can recognize while scheduling such workloads.

Priority: Latency sensitive applications such as interactive services can be considered higher priority workloads when compared to batch processing applications. Under resource constraints the meta-scheduler can prioritize higher priority applications over lower priority applications.

Configuration and operational context: Applications can employ a host of special hardware such as accelerators and field programmable gate arrays (FPGAs) to work efficiently. For example, machine learning model trainings can be performed on discrete GPUs while inference can be done on accelerators such as tensor processing units (TPUs). The meta-scheduler can recognize workload hardware resource requirements while scheduling workloads.

Affinity to edge devices specified by a customer: Some workloads can be defined only within the context of some specific SD-WAN edges and be deployable on only some predefined SD-WANs.

Anti-affinity to edge devices specified by a customer: This is the reverse context of the affinity to some edge devices specified by a customer. The application developer can provide predefined SDWANs to avoid while deploying workloads.

Eviction deadlines from edge devices: SD-WAN edge devices can be scheduled to be evicted from their clusters for various reasons. In such cases, the meta-scheduler can deploy short-lifetime applications to avoid having to pre-empt applications to meet SD-WAN eviction deadlines.

Figure 2:
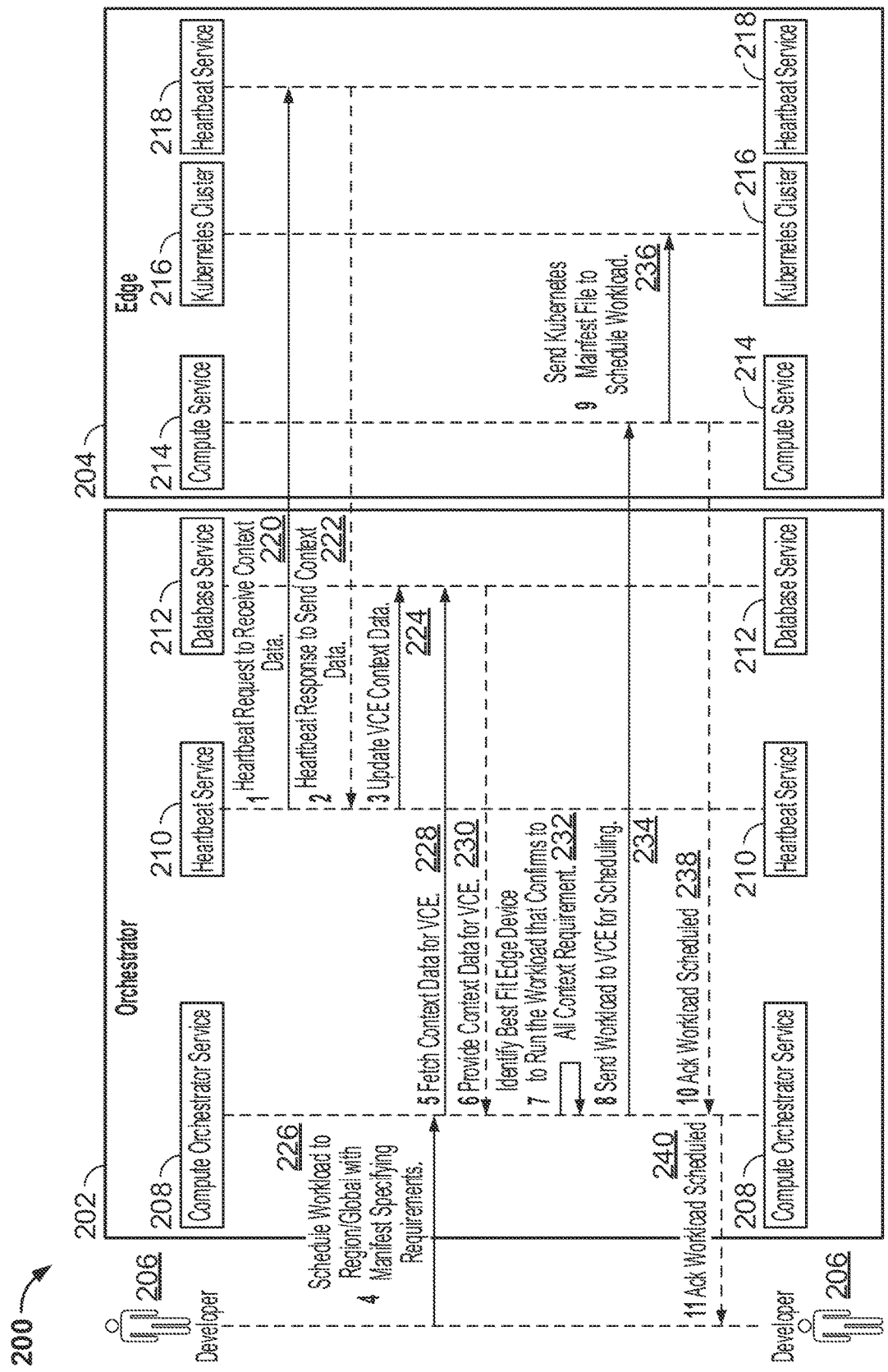
FIG. 2 illustrates an example flow for context based meta scheduling of containerized workloads across clusters of edge devices, in accordance with example implementations of this disclosure.

FIG. 2 illustrates an example flow 200 for context based meta scheduling of containerized workloads across clusters of edge devices, in accordance with example implementations of this disclosure. Example flow 200 can include the following steps.

At 220, a heartbeat request is sent from heartbeat service 210 in orchestrator 202 to heartbeat service 218 in edge 204 to receive context data of each edge device managed by edge 204. In some implementations, the requested context data include one or more aforementioned context elements.

At 222, the requested context data is sent from heartbeat service 218 in edge 204 to heartbeat service 210 in orchestrator 202.

At 224, context data stored in database service 212 of orchestrator 202 is updated based on the context data received by heartbeat service 210 at step 222.

At 226, developer 206 schedules a containerized workload to be run at regional or global level by creating a manifest file specifying all the context requirements for the containerized workload. Developer 206 can create the manifest file by importing a YAML file to compute orchestrator service 208 or using the graphic user interface (GUI) of compute orchestrator service 208 to create the manifest file. In some implementations, the context requirements specified in the manifest file include all the preferences specified by developer 206 and resource allocation requests along with specifications for the containerized workload, as described in the example context elements above. Example preferences include context elements such as compliance, sovereignty, and sustainability. Example specifications include context elements such as runtime, security, and resource requirements for the workload runtime. When the containerized workload is run at the regional level, developer 206 specifies a region to run the containerized workload. An example region includes the geographical or virtual boundaries which a workload must be confined to, a set of servers geographically located at a specific location within which a workload's data and execution context must reside, or a virtual overlay region governed by custom rules which the workloads must abide by. When the containerized workload is run at the global level, developer 206 does not specify any edge device or region, rather the containerized workload can be run on any edge device registered to orchestrator 202 and satisfies all the context requirements specified in the manifest file.

At 228, compute orchestrator service 208 sends a request to database service 212 to fetch context data stored in databased service 212.

At 230, database service 212 provides the requested context data to compute orchestrator service 208.

At 232, compute orchestrator service 208 identifies an edge device to run the containerized workload, based on the context data fetched at step 230 for each edge device, where the context data of the identified edge device meets all the context requirements specified in the manifest file. In some implementations, edge devices that do not fulfill requirements of context elements such as compliance, sovereignty, and tenancy are filtered out. The remaining edge devices are sorted based on the continuous/quantitative values of context elements such as CPU and memory, and the best fit edge device to run the containerized workload is identified. If the containerized workload is scheduled at step 226 to be run at regional level, the containerized workload is then tagged to the region (as opposed to a particular edge device) and can then be moved across any edge device in the region. The movement from one edge device to another edge device in the same region can be triggered by different reasons, such as breach of context at an edge device running the containerized workload, load balancing, and defragmentation of workload. If the containerized workload is scheduled at step 226 to be run at global level, the containerized workload can be migrated to another edge device that is later classified as the best fit, depending on changes in context at each edge device.

At 234, the containerized workload is sent from compute orchestrator service 208 to compute service 214 in edge 204 for scheduling to run the containerized workload on the edge device identified at step 232.

At 236, a manifest file of a container orchestration platform such as Kubernetes™ is sent from compute service 214 to cluster 206 of the container orchestration platform for scheduling to run the containerized workload on the edge device determined at step 232.

At 238, an acknowledgement that the containerized workload has been scheduled to run on the edge device identified at step 232 is sent from compute service 214 to compute orchestrator service 208.

At 240, an acknowledgement that the containerized workload has been scheduled to run on the edge device identified at step 232 is sent from compute orchestrator service 208 to developer 206.

In some implementations, at 226, instead of scheduling the containerized workload to be run at regional or global level, developer 206 can specify exactly the edge device to run the containerized workload. Then compute orchestrator service 208 in orchestrator 202 can validate that the specified edge device adheres to all the context requirements of the containerized workload, for example, having enough spare resources to fulfill the workload requirements and requirements associated with other context elements such as the tenancy, sovereignty, and compliance. If the specified edge device does satisfy all the context requirements, then the containerized workload can be scheduled on the specified edge device and pinned to the edge device, so that it can be run on the specified edge device.

In some implementations, when containerized workloads are run on an SD-WAN edge device, SD-WAN functionalities at the SD-WAN edge device are prioritized, and the spare resources at the SD-WAN edge device are provisioned to run the containerized workloads via the cluster of the container orchestration platform setup on the SD-WAN edge device. The SD-WAN edge device needs to comply with all the context requirements specified in the manifest file for the containerized workloads to be scheduled on that SD-WAN edge device.

In some implementations, once the containerized workloads have been scheduled on an SD-WAN edge device, there may be runtime changes on the SD-WAN edge device that breach the context at the SD-WAN edge device. For example, if the SD-WAN traffic at the SD-WAN edge device grows and demands more resources for handling the traffic, the associated request for SD-WAN will be prioritized. This can result in deallocation of part of the spare resources from the cluster of the container orchestration platform. Therefore the cluster of the container orchestration platform no longer has the resources demanded by the containerized workload, and the containerized workload cannot run its states on the SD-WAN edge device.

Figure 3:
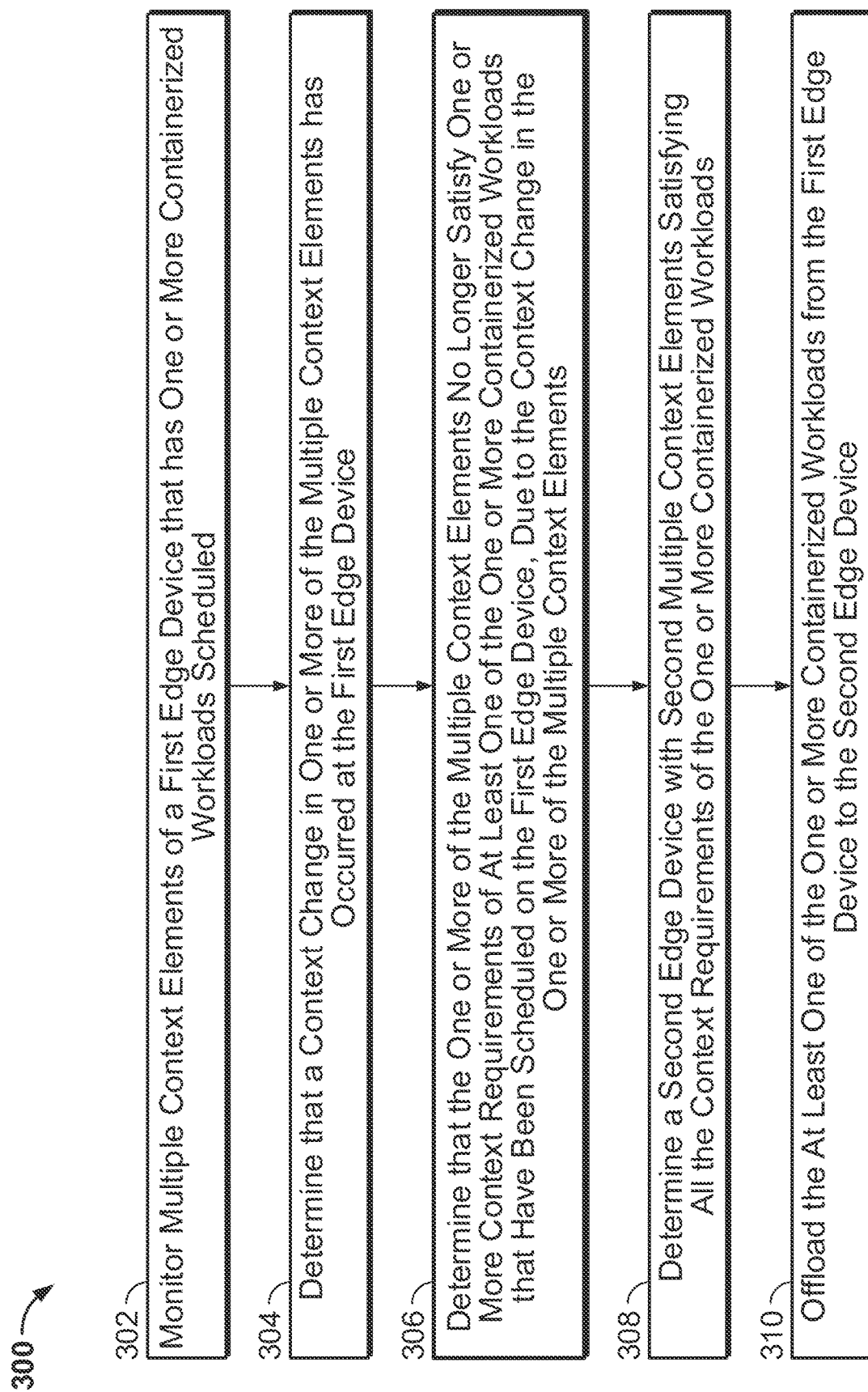
FIG. 3 illustrates an example flow for remediation of containerized workloads based on context breach at edge devices, in accordance with example implementations of this disclosure.

FIG. 3 illustrates an example flow 300 for remediation of containerized workloads based on context breach at edge devices, in accordance with example implementations of this disclosure. The remediation provided by example flow 300 includes identifying context breach and offloading the containerized workloads to another edge device so that the containerized workloads can be run on that edge device.

At 302, compute service at a first edge device that has one or more containerized workloads scheduled monitors multiple context elements of the first edge device using application programming interfaces (APIs) of a container orchestration platform, for example, Kubernetes™. Every workload of the one or more containerized workloads has a set of context requirements that the first edge device needs to satisfy in order for the one or more containerized workloads to be scheduled on the first edge device. In some implementations, the first edge device is a SD-WAN edge device.

At 304, the compute service determines that a context change in one or more of the multiple context elements has occurred at the first edge device. For example, more load on SD-WAN results in deallocation of resources from the cluster of the container orchestration platform. In some implementations, the compute service can update the configuration of the container orchestration platform to reflect the context change.

At 306, the compute service determines that the one or more of the multiple context elements no longer satisfy one or more context requirements of at least one of the one or more containerized workloads that have been scheduled on the first edge device, due to the context change in the one or more of the multiple context elements.

At 308, the compute service determines a second edge device with second multiple context elements satisfying all the context requirements of the one or more containerized workloads, by calling the API of an orchestrator to perform the determination process. In some implementations, the second edge device is a SD-WAN edge device. The second edge device can be the closest edge device to the first edge device among all edge devices within the same tenant that includes the first edge device. A tenant can be an enterprise that has one or more edge devices.

At 310, the compute service offloads the at least one of the one or more containerized workloads from the first edge device to the second edge device. In some implementations, the at least one of the one or more containerized workloads on the first edge device is then killed.

Resource underutilization or overutilization at edge devices can occur when resource allocations for running containerized workloads are defined by a user, resulting in either resource wastage or performance degradation of the containerized workloads. Such misallocation at edge devices can also reduce workload offload opportunities and lead to increased operating expenses.

Figure 4:
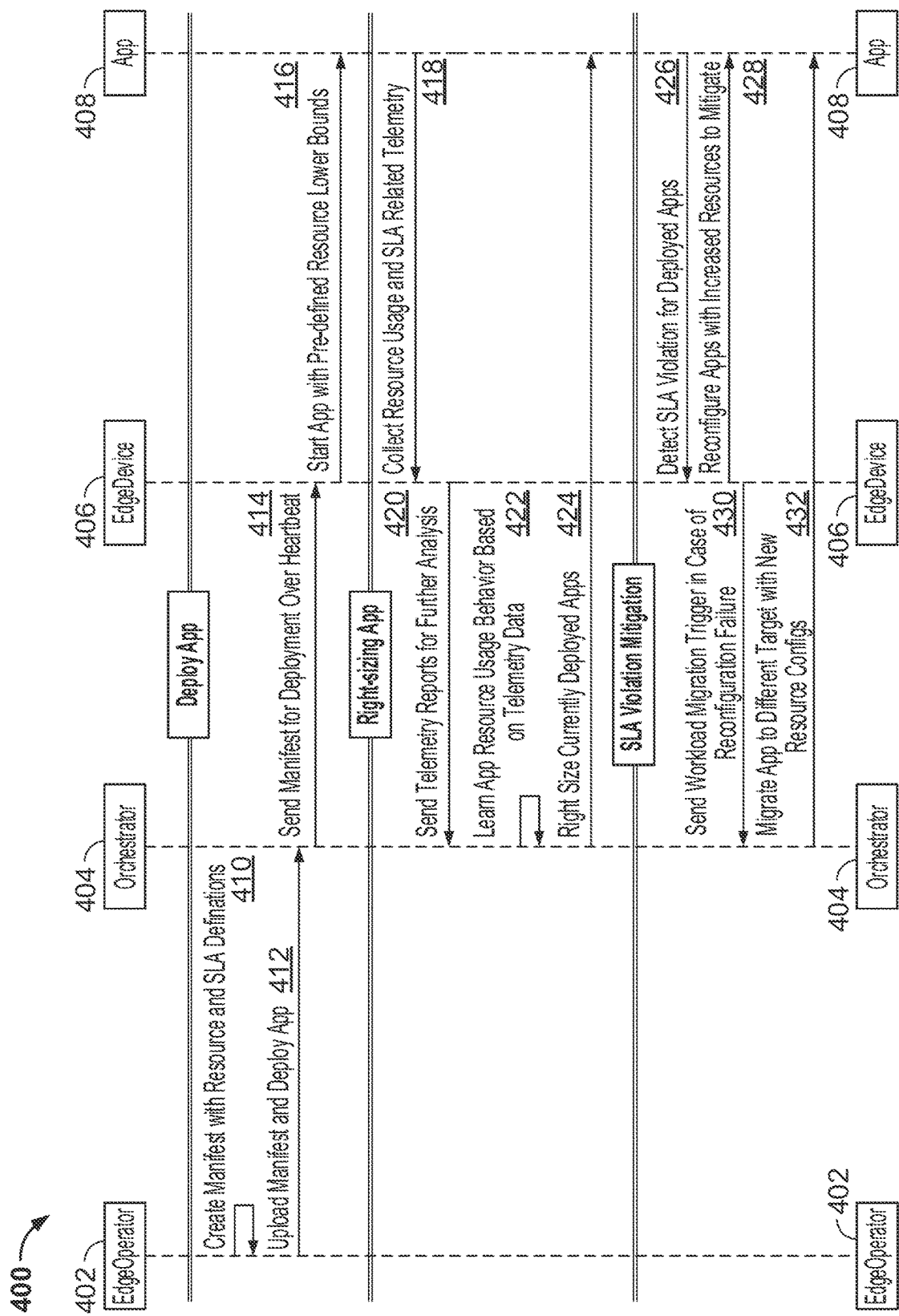
FIG. 4 illustrates an example flow for right-sizing containerized workloads running on edge devices to meet workload service level agreement adaptively, in accordance with example implementations of this disclosure.

FIG. 4 illustrates an example flow 400 for right-sizing containerized workloads running on edge devices to meet SLAs adaptively, in accordance with example implementations of this disclosure.

At 410, an edge operator 402 creates a manifest file that includes resource requirements and SLA definitions. The manifest file can include resource requirements for deploying a workload, for example, containerized workload 408, and pre-defined resource upper bounds, which can be used by the compute service to reserve and utilize resources at edge device 406. The SLA definitions include a set of measurable and configurable SLAs that are maintained by containerized workload 408. In some implementations, the SLA definitions can be a list of parameters specific to containerized workload 408. Example SLAs can include effective service performance (for CPU, memory, and round-trip-time), execution cost (for cost of compute and network bandwidth), and availability (for deployment target configurations that support redundancy and failover within a tolerance window).

At 412, the edge operator 402 uploads the manifest file to orchestrator 404 and instructs orchestrator 404 to deploy containerized workload 408 on edge device 406.

At 414, orchestrator 404 sends the manifest file to edge device 406 using a heartbeat mechanism between orchestrator 404 and edge device 406 for deployment of containerized workload 408 on edge device 406.

At 416, edge device 406 starts containerized workload 408 with the pre-defined resource upper bounds included in the manifest file.

At 418, edge device 406 uses a management daemon (MGD) to collect from containerized workload 408 resource usage at regular intervals and monitors SLA related telemetry data from containerized workload 408.

At 420, edge device 406 sends the telemetry data to orchestrator 404 using the heartbeat mechanism between edge device 406 and orchestrator 404.

At 422, orchestrator 404 learns resource usage behavior of containerized workload 408 and associated SLA requirements based on the telemetry data, and predicts future resource needs of containerized workload 408. In some implementations, resource usage behavior of containerized workload 408 and associated SLA requirements can be collected from edge device 406 and sent to orchestrator 404. A filter, grouping, or compression feature can be in place to collect the data points. The collected data can be used to predict future resource needs of containerized workload 408 by using statistical prediction models.

At 424, orchestrator 404 right-sizes containerized workload 408 that is currently deployed on edge device 406 by recommending tighter bounds on the resource allocations, based on future resource needs of containerized workload 408 predicted at step 422.

At 426, edge device 406 detects SLA violation for containerized workload 408 deployed on edge device 406.

At 428, edge device 406 reconfigures containerized workload 408 with increased resource allocations to mitigate SLA violation.

At 430, edge device 406 sends workload migration trigger when reconfiguration at step 428 fails.

At 432, orchestrator 404 migrates containerized workload 408 to a second edge device that has resource configuration accommodating the increased resource allocations.

Resource underutilization at edge devices can lead to decreased opportunities to offload containerized workloads to other edge devices. It can also lead to workload performance degradation and increased operating expenses. Reducing resource underutilization can allow end-users to better pack their workloads and offload more containerized workloads on existing edge devices.

Figure 5:
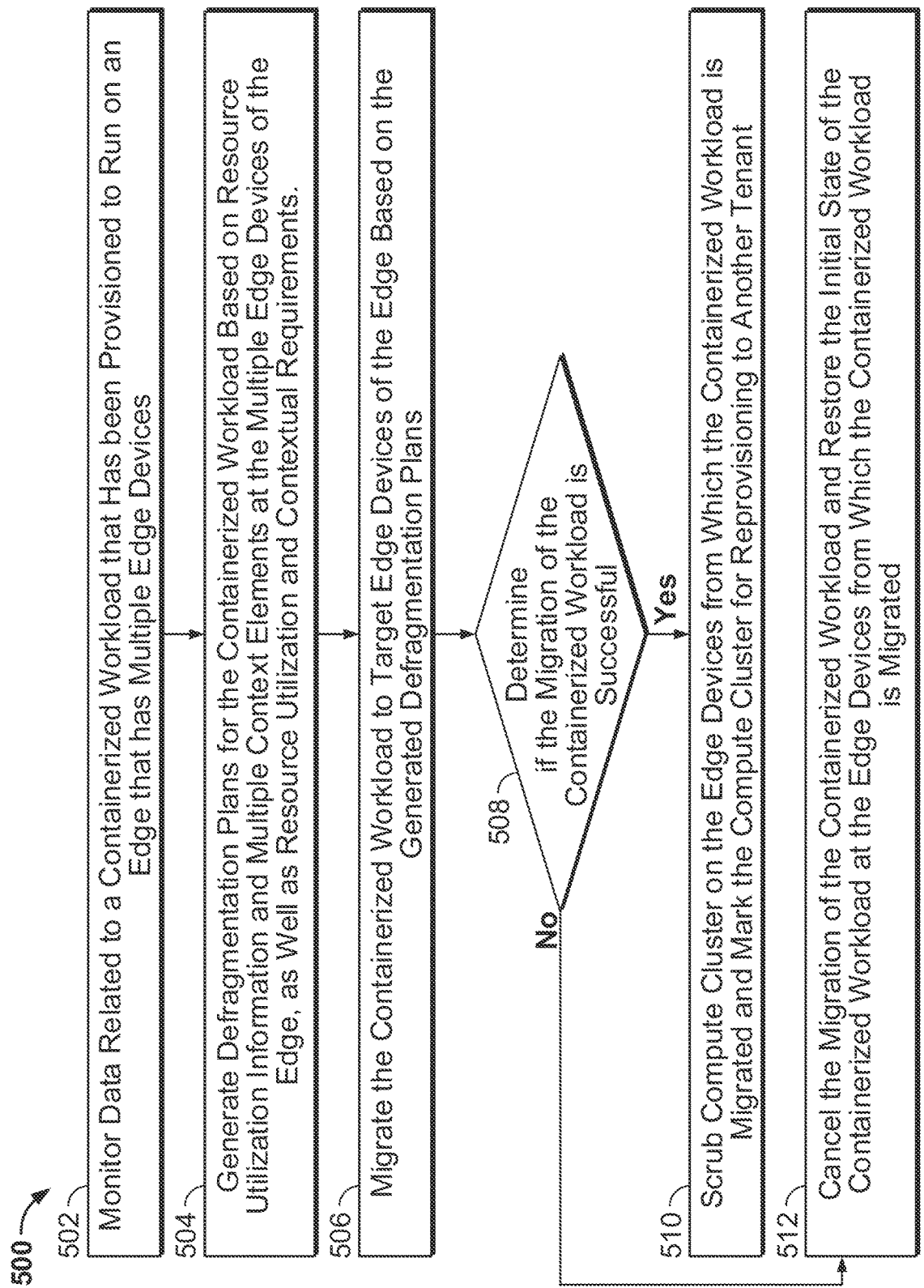
FIG. 5 illustrates an example flow for context-sensitive defragmentation and aggregation of containerized workloads running on edge devices, in accordance with example implementations of this disclosure.

FIG. 5 illustrates an example flow 500 for context-sensitive defragmentation and aggregation of containerized workloads running on edge devices to reduce resource underutilization at edge devices, in accordance with example implementations of this disclosure.

At 502, once a containerized workload has been provisioned to run on an edge that has multiple edge devices, the compute service at the edge continually monitors and collects telemetry data associated with the containerized workload. The telemetry data can include resource utilization at the first edge device, with example resources including CPU, memory, and network bandwidth. The telemetry data can also include multiple context elements at the first edge device, such as inter-workload trigger dependency and inter-workload data dependency. The compute service at the edge monitors inter-workload data transfer and inter-workload trigger dependency both for containerized workloads running within the same cluster and across clusters. In some implementations, services constituting applications are not independent to each other. These services can exhibit dependencies amongst themselves for both data and trigger. Data dependency can refer to the inter-service dependency where the exit state context of a service is ingested by one or more secondary stage services for further processing. On the other hand, events or signals generated by primary services can also be used to trigger secondary and tertiary stages even without any direct data dependency. These dependencies can be viewed as directed acyclic graphs (DAGs) with the services at their nodes and trigger dependency or data dependencies at their edges. The telemetry data collected includes data such as payload size for inter-workload calls and trigger latency. The telemetry data is communicated to an orchestrator at regular intervals for further analysis.

At 504, the orchestrator generates defragmentation plans for the containerized workload based on the telemetry data that includes resource utilization and multiple context elements at the multiple edge devices of the edge, as well as resource utilization and contextual requirements.

In some implementations, utilization triggered defragmentation includes two components: a) based on the telemetry data, the orchestrator identifies edge devices that are consistently under-utilized, and b) the orchestrator shows to the user through the orchestrator UI the possible resource savings, operating expense reduction, and sustainability improvements on defragmenting the containerized workload. The orchestrator can continually monitor edge device performance via a heartbeat mechanism. It can collect a host of metrics such as resource utilization over time. Based on analysis of the collected metrics if the orchestrator detects that some edges have been continually underutilized, it can trigger a defragmentation analysis on these edges. During the analysis stage, the orchestrator develops scenarios to gauge resource savings and in-turn expense reduction if the current workloads scheduled on a target node are migrated to a neighboring node and the target node is decommissioned. These scenarios are then presented to the user via the orchestrator UI. The defragmentation process can also be triggered when the system runs low on resources or when each node has some unutilized spare capacity which can't be repurposed for placing workloads or groups.

In some implementations, context triggered defragmentation includes three components: a) based on the telemetry data, the orchestrator identifies workloads with interdependencies including trigger dependency and data dependency, b) the orchestrator then calculates performance improvement in defragmenting these workloads and co-locating them, and c) the performance improvement data are made available to the user through the orchestrator UI. Trigger dependency and data dependency can be identified in two ways. First, a developer can explicitly detail any dependencies amongst its services. Second, in the absence of explicit dependency definition, the orchestrator can trace inter-workload callbacks and data transfers. The orchestrator can also track workload execution times and form timelines based on the collected data. Based on a combination of callback and data transfer traces and execution timelines, the orchestrator can form probabilistic models of inter-workload trigger dependency and data dependency. The calculation of performance improvement can be done in three stages. The first stage involves telemetry data collection regarding a workload resource requirements and runtime behavior based on resource availability and inter-workload trigger dependency and data dependency. The telemetry data can include resource consumption metrics such as CPU, memory, bandwidth and input/output (I/O) resource consumptions along with runtime metrics such as execution time, response time, turn-around time and other metrics used to quantize workload performance. These telemetry data collected over time and under different deployment and execution conditions can be used to model workload behavior. The model can then be used to create scenarios and predict any savings and reduction in resource costs, along with improvement in workload performance based on predicted resources saved, reduction in inter-workload trigger and data transfer latency, and context and runtime sharing.

At 506, once the defragmentation process is triggered by the user, the orchestrator tags the containerized workload for migration and marks the edge devices from which the containerized workload migrates as un-schedulable. The orchestrator then migrates the containerized workload to target edge devices of the edge based on the generated defragmentation plans, using for example meta scheduling described in FIG. 2.

At 508, the orchestrator determines if the migration of the containerized workload is successful.

If the migration is successful, step 510 is performed to scrub compute cluster on the edge devices from which the containerized workload migrates and to mark the compute cluster for reprovisioning to another tenant. In some implementations, a compute cluster can be a network of SD-WAN edge devices managed by a centralized orchestrator, with each such device running a container orchestration platform based compute stack capable of running containerized applications.

If the migration fails, step 512 is performed to cancel the migration of the containerized workload and restore the initial state of the containerized workload at the edge devices from which the containerized workload is migrated.

In some implementations, when a containerized workload is deployed on an edge device, the cluster of a container orchestration platform manages the lifecycle of the containerized workload. However, if the edge device fails due to one or more of hardware failure, network failure, workload failure, or workload SLA breach, the cluster runtime of the container orchestration platform may not be able to restart the containerized workload.

Figure 6:
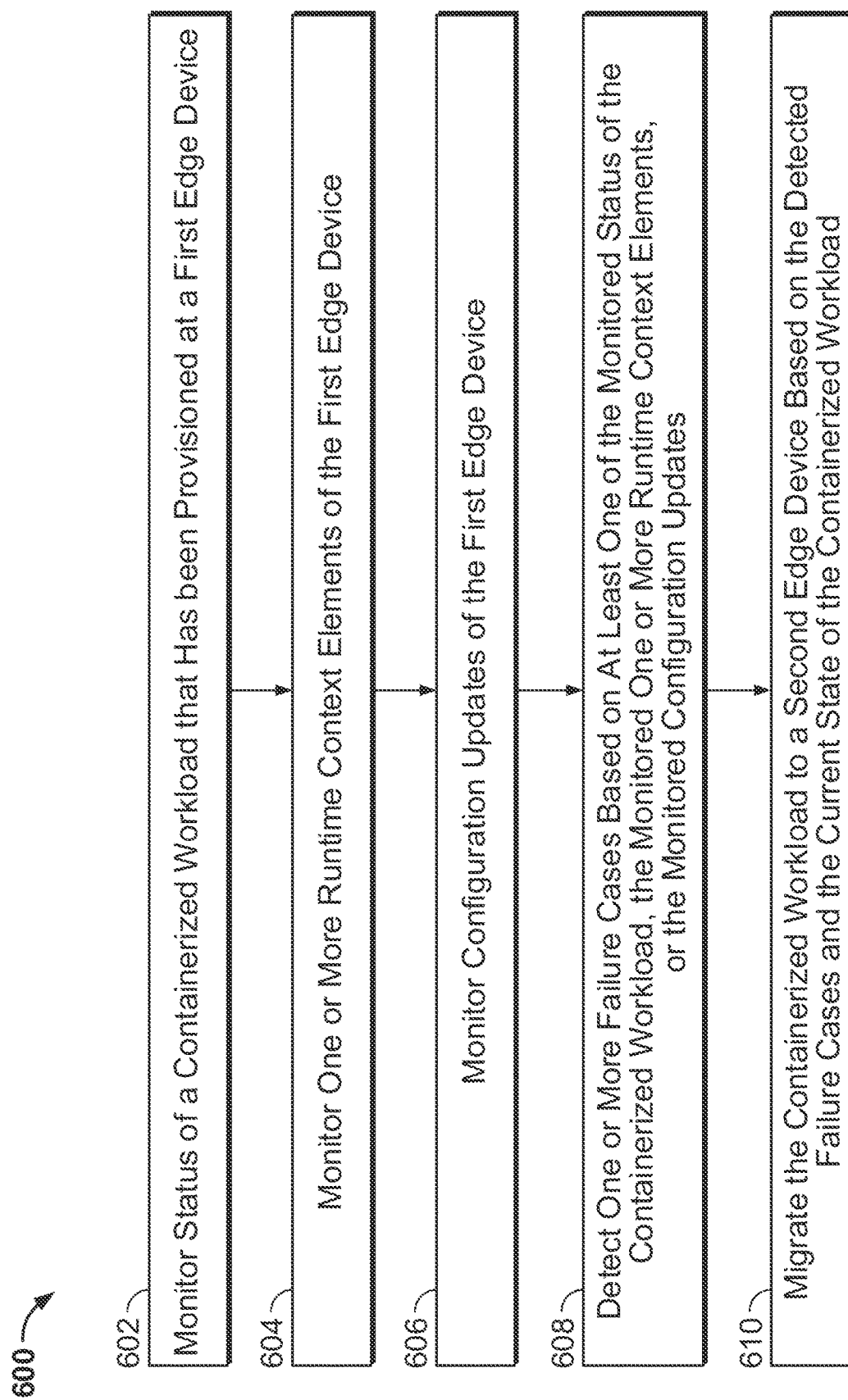
FIG. 6 illustrates an example flow for inter-cluster automated failover and migration of containerized workloads across edges devices, in accordance with example implementations of this disclosure.

FIG. 6 illustrates an example flow 600 for inter-cluster automated failover and migration of containerized workloads across edges devices, in accordance with example implementations of this disclosure. The inter-cluster automated failover and migration of containerized workloads enable automated migration of containerized workload to another edge device when the edge device where the containerized workload is deployed fails.

At 602, a highly available (HA) controller engine external to a first edge device uses APIs of a container orchestration platform to monitor status of a containerized workload that has been scheduled on the first edge device. In some implementations, the first edge device can be a SD-WAN edge device. The status of a containerized workload can be the workload's health. Based on telemetry data such as resource utilization and trigger response time along with explicit signals from the application itself, the orchestrator can establish the health of a workload. If the workload metrics are within predefined operational parameters then the workload is deemed healthy. Otherwise the workload is marked degraded. Then the orchestrator can establish a cause for the degradation. For example, based on resource utilization and trigger response time the orchestrator may determine whether the workload is overloaded or straggling and if so the resource axis along which the overutilization is happening.

At 604, the HA controller engine monitors one or more runtime context elements of the first edge device. Example runtime context elements include SD-WAN resource consumption at the first edge device. Additional runtime context elements are discussed in description associated with meta-scheduling described in FIG. 2.

At 606, the HA controller engine monitors configuration updates of the first edge device.

At 608, the HA controller engine detects one or more failure cases at the first edge device based on at least one of the monitored status of the containerized workload, the monitored one or more runtime context elements, or the monitored configuration updates.

In some implementations, the failure cases can include: a) the first edge device can go down resulting in the heartbeat communication to and from the first edge device to fail multiple times; b) the HA controller engine received updated configuration which scales down the resources provided for running the containerized workload resulting in the cluster having less than enough resources to continue running the containerized workload; c) the cluster of the container orchestration platform continuously fails to run the containerized workload for reasons other than the administrator of the container orchestration platform downsizing the cluster; and d) the higher priority SD-WAN functions at the first edge device having increased load thus consuming more resources resulting in the compute service at the first edge device to give up resources allocated for running the containerized workload.

At 610, the HA controller engine migrates, using the meta-scheduling described in FIG. 2, the containerized workload to a second edge device based on the detected failure cases and the current state of the containerized workload.

In some implementations, considering the current state of the containerized workload for migration of the containerized workload can include: a) calculating the proximity of the destination cluster, form the source cluster; b) calculating the cost of the migration; and c) calculating the time required for the migration.

In some implementations, a failure at an edge device that leads to the failover of workloads running on the edge device can include hard failure, soft failure, and workload level failure. Hard failure can lead to forced failover. Hard failure can include edge device failure due to failure in the heartbeat mechanism between the edge device and the HA controller engine that controls the process of detecting the failure, analyzing the failure, and performing remediation that can include failover of the workloads running on the edge device. Hard failure can also include network controller failure, storage failure, and other system level failures. Some of these failures lead to manual intervention for recovery. Hard failure can be found in system and application mechanisms. Soft failure can include system level SLA breach, system configuration corruption, and tamped system configuration (security failure). Workload level failure occurs when workloads fail to respond. The detection, analysis, and remediation of these failures are described in more details below.

In some implementations, the failure is an edge device failure due to failure in the heartbeat mechanism between the edge device and the HA controller engine. This failure is a hard failure. The heartbeat mechanism monitors and tracks the health of the resources at the edge device to keep the compute service at the edge device highly available. If a heartbeat is missing, the HA controller engine indicates an edge device failure due to failure in the heartbeat mechanism. When the HA controller engine performs failure mode analysis of this failure, it maintains the ontology of the deployment configuration, which can be an initial configuration a developer sets on a per-service basis, based on which the orchestrator selects target nodes and allocates resource quotas. The HA controller engine analyzes the context (including the dependencies) and performs failover of the workloads hosted on the edge device to another edge device or distributes the workloads among available edge devices that have the capacity to support the workloads. An example of context analysis can include two stages. In the first stage, telemetry data is collection by the orchestrator. The orchestrator collects metrics related to the deployed workloads including resource usage, runtime performance and inter-service dependency. In the second stage, the long term metrics data is used to create predictive models of the workload. The predictive workload models can be used to find optimal alternate locations for failover. When the HA controller engine performs remediation of this failure, it performs failover of the workloads to another edge device. It also continually monitors the available capacity of the edge device and provides warning on the risk of system oversubscription state.

In some implementations, the failure is a network controller failure. This failure is a hard failure. When detecting this failure, the HA controller engine tracks the health of all network controllers under its domain via network monitors and using the heartbeat mechanism for collecting telemetry data from edge devices serving as worker nodes in a container orchestration platform. When the heartbeats are detected but network monitors indicate service unreachability at one or more network controllers, a network controller failure is triggered. When the HA controller engine performs failure mode analysis of this failure, it maintains the ontology of the deployment configuration for the network controllers. It analyzes the workload contexts (network bandwidth, security policies, network topology etc.) for the failed one or more network controllers and generates a dependency plan. For example, three elements can be drawn from the workload context to construct the dependency plan. The first element is static schema (directed acyclic graph (DAG)) of the workload deployment topologies. This can include target hardware environment, special accelerator environment, and supporting ecosystem workload requirements that can be collocated on the same node and their dependency plan. The second element is dynamic context of the workload and its dependent components, which can include the telemetry used to determine their performance, cost, and availably status on the current node and how far they are meeting their respective service level objective (SLO) (e.g., cost, performance, security, and availability) needs. The third element is tolerance threshold for the service level objectives (SLOs) for each component. If any of the dependent component's SLO is breached beyond the tolerance threshold, the workload can be marked to indicate that it could potentially fail. When the HA controller engine performs remediation of this failure, it redeploys the workloads and rescales controller nodes based on the dependency plan. The failed one or more network controllers are marked as unreachable. Subsequently, network tables are updated to include updated domain name system (DNS) and internet protocol (IP) routes. For example, the contextual requirements of the nodes of the DAG can be applied and the target node(s) to failover the workload can then be determined.

In some implementations, the failure is a storage or other hardware failure. This failure is a hard failure. When detecting this failure, the HA controller engine uses multiple node-local system monitors to monitor the edge devices serving as worker nodes. These multiple node-local system monitors collects information about the hardware and software criticalities such as storage drive failure and memory corruption. Any failure in hardware is reported to the controller nodes in the container orchestration network using the heartbeat mechanism. When the HA controller engine performs failure mode analysis of this failure, it maintains the ontology of the deployment configuration. Based on context (including the dependencies) analysis and runtime heuristics, a workload dependency plan is generated by the HA controller engine. When the HA controller engine performs remediation of this failure, it marks all workloads deployed on the affected worker nodes as reschedulable. The workloads hosted on the affected worker nodes are failed over to an alternate node or distributed among available nodes that have the capacity to support the workloads based on the dependency plan. The affected worker nodes are cordoned off as un-schedulable.

In some implementations, the failure is a system level SLA breach. This failure is a soft failure. When detecting this failure, the HA controller engine uses multiple node-local system monitors to monitor the health of primary workloads and system critical services. Primary workloads can be tier-1 SD-WAN edge services that support the core functionalities of the SD-WAN edge devices. These workloads can be native services that are pre-deployed on the SD-WAN edge devices and execute outside of the context of the compute clusters. System critical services can be those which are essential for the health of a SD-WAN edge device. They can include the base operating system, the security sandboxes within which the workloads execute, heartbeat mechanism along with monitoring and management services. When a breach in SLA is detected based on predefined QoS limits in any of the primary workloads, the breach of SLA is reported to the controller nodes using the heartbeat mechanism. When the HA controller engine performs failure mode analysis of this failure, it maintains the ontology of the deployment configuration for all secondary workloads deployed on the worker nodes. Secondary workloads can be workloads managed by the compute cluster and opportunistically deployed on edge devices based on availability of resources. These workloads are deployed as long as resources are available and no resource pressure exists for the primary workloads. In case of any observed resource strain or adverse effects on the primary workloads, the secondary workloads are pre-empted. The HA controller engine analyzes the context (including the dependencies) based on access patterns and deployment topology and generates a dependency map. When the HA controller engine performs remediation of this failure, each worker node identifies secondary workloads currently deployed on it and attempts to right-size the resource allocated to the secondary workloads without breaching their SLAs. When right-sizing does not improve the system health parameters or when right-sizing is not possible, all the non-critical or secondary workloads are marked as preemptible. The meta-scheduler illustrated in FIG. 2 can be invoked to reschedule the preemptible workloads that have the largest resource footprints, until SLA parameters satisfy SLA requirements. The meta-scheduler can also choose to migrate multiple secondary workloads in response to the initial workload migration to maintain inter-workload dependency.

In some implementations, the failure is a configuration corruption. This failure is a soft failure. When detecting this failure, the HA controller engine uses multiple node-local system monitors to monitor corruption in system configuration files or in deployment signatures of secondary workloads. When a configuration corruption is detected, the node-local system monitors report it to the control nodes using the heartbeat mechanism, describing the nature of the corruption and the affected workloads. When the HA controller engine performs failure mode analysis of this failure, it maintains the ontology of the deployment configuration for all secondary workloads deployed on the worker nodes. It analyzes the context (including the dependencies) based on access patterns and deployment topology and generates a dependency map. When the HA controller engine performs remediation of this failure, the control plane attempts to update the corrupted configuration using the heartbeat mechanism and re-initialize any affected workloads. When the control plane fails to mitigate the issue, the affected workloads are preempted and rescheduled to an alternate node. If the corruption in deployment signatures of secondary workloads belongs to a system critical service, all workloads are failed over to an alternate node based on the dependency map, and the corrupted node is marked un-schedulable. The meta-scheduler can choose to migrate multiple secondary workloads in response to the initial workload migration to maintain inter-workload dependency.

In some implementations, the failure is a tampered configuration. This failure is a soft failure. When detecting this failure, the worker nodes carry out real time threat analysis of all primary and secondary workloads. A secondary long-term, non-real time workload-signature analysis is carried out at the controller nodes, based on parameters such as workload access patterns, deep packet inspection, and configuration analysis. Such analysis can include multiple passes. For example, a first pass is to determine whether the root cause to the tampered configuration is a misconfiguration. Static metadata can refer to schema, configuration, and security profile of the nodes. Dynamic metadata can refer to monitoring the runtime state of the nodes, such as trends and logs. A second pass can be an analysis in depth. In this stage logs are examined, and it is determined what is the actual cause(s) of the breach (e.g., examine network and firewall configurations, traffic traceback, and security checks). When an intrusion is detected at a node a tampered configuration failure is determined. When the HA controller engine performs failure mode analysis of this failure, it maintains the ontology of the deployment configuration for all secondary workloads deployed on the worker nodes. It analyzes the context (including the dependencies) based on access patterns and deployment topology and generates a dependency map. When the HA controller engine performs remediation of this failure, the node with detected intrusion is cordoned off and marked un-schedulable. All workloads are pre-empted and based on predefined policies are either rescheduled on alternate nodes or quarantined in a secure zone. A core dump of the affected node is stored on a secure server for future forensic analysis.

In some implementations, the failure is a workload SLA breach. This failure is a soft failure. When detecting this failure, the HA controller engine uses multiple node-local system monitors to monitor the health of all secondary workloads deployed on an edge device serving as a worker node. When a breach is detected against predefined user-specified workload SLAs, the node-local system monitors reports the breach to controller nodes using the heartbeat mechanism. When the HA controller engine performs failure mode analysis of this failure, it maintains the ontology of the deployment configuration for all secondary workloads deployed on the worker nodes. It analyzes the context (including the dependencies) based on access patterns and deployment topology and generates a dependency map. When the HA controller engine performs remediation of this failure, it attempts to mitigate the workload SLA breach by re-adjusting resource allocations on the worker node. When resource re-adjustment does not mitigate the breach or the worker node is unable to commit to the re-adjusted resource requests, the workload is pre-empted and rescheduled on a separate node. The meta-scheduler can choose to migrate multiple secondary workloads in response to the initial workload migration to maintain inter-workload dependency.

Figure 7:
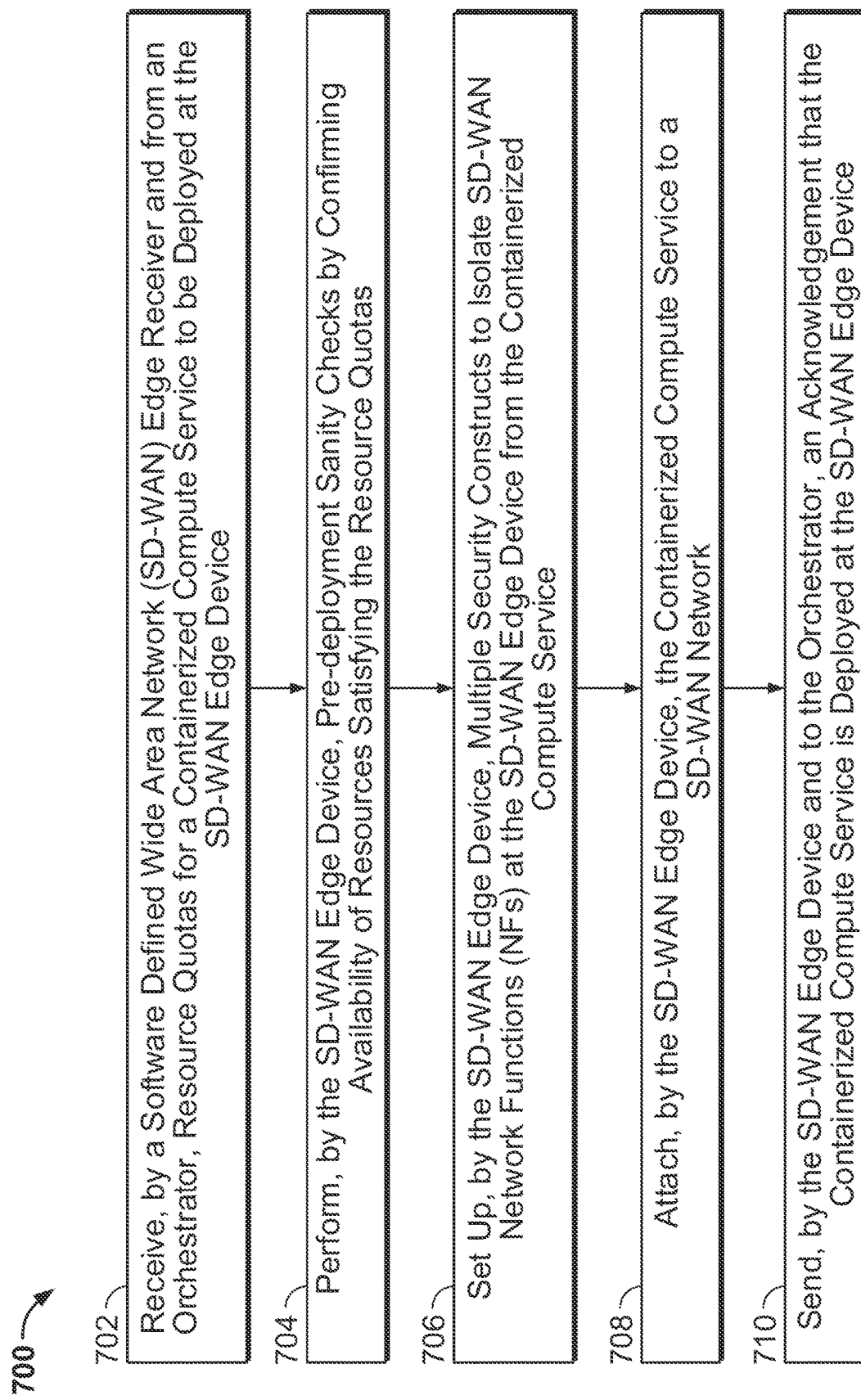
FIG. 7 is a flowchart illustrating an example of a method for automating secured deployment of containerized workloads on edge devices, in accordance with example implementations of this disclosure.

FIG. 7 illustrates an example of a method 700 for automating secured deployment of containerized workloads on edge devices, in accordance with example implementations of this disclosure.

At 702, a computer system receives, from a remote manager, resource quotas for a compute service to be enabled at a SD-WAN edge device.

At 704, the computer system performs pre-deployment sanity checks by confirming availability of resources satisfying the resource quotas, where the resources are at the SD-WAN edge device.

At 706, the computer system sets up multiple security constructs to isolate SD-WAN network functions (NFs) at the SD-WAN edge device from the compute service.

At 708, the computer system attaches the compute service to a SD-WAN network.

At 710, the computer system sends to the remote manager an acknowledgement that the compute service is enabled at the SD-WAN edge device.

Figure 8:
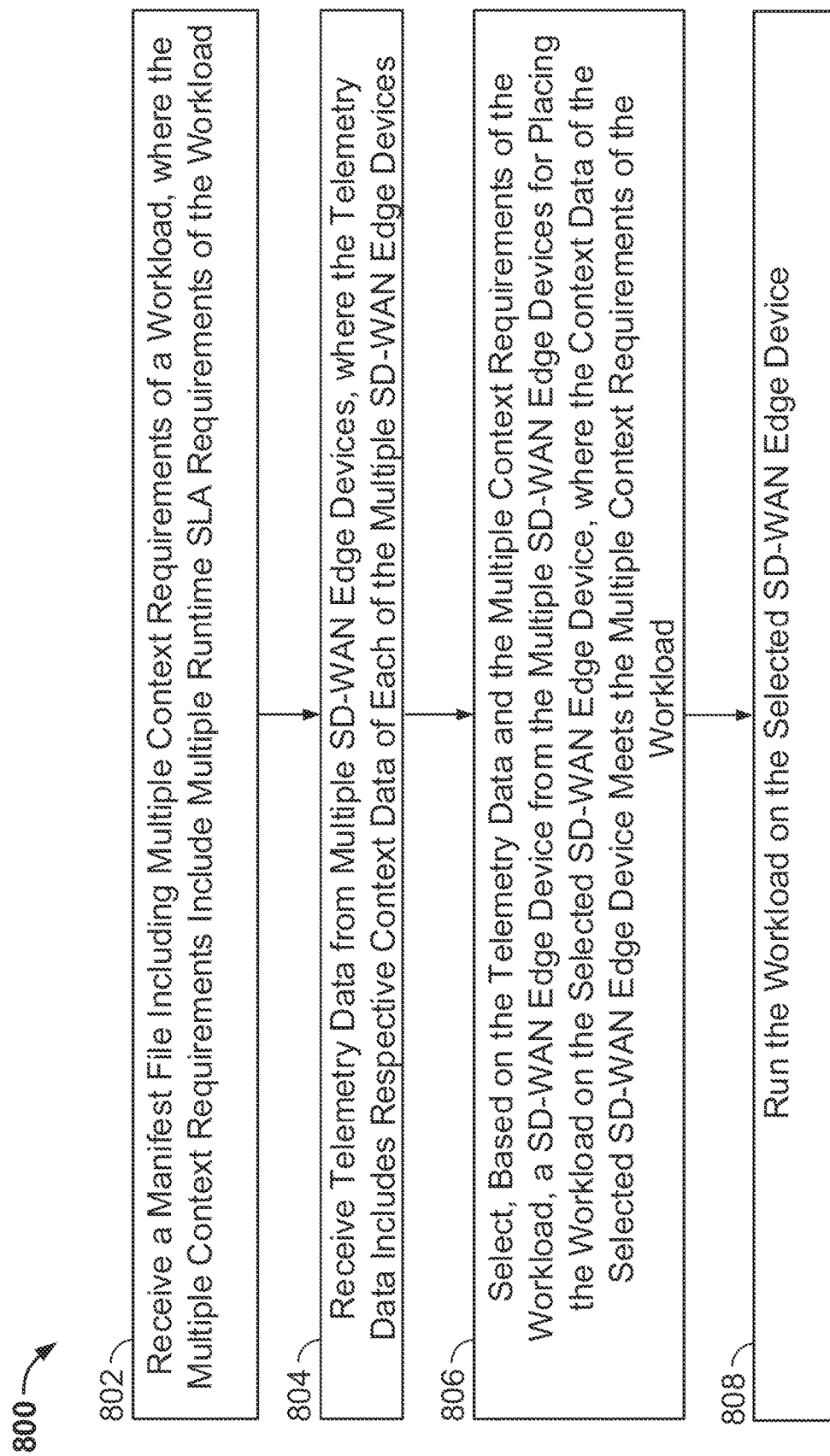
FIG. 8 is a flowchart illustrating an example of a method for context based meta scheduling of containerized workloads across clusters of edge devices, in accordance with example implementations of this disclosure.

FIG. 8 illustrates an example of a method 800 for context based meta scheduling of containerized workloads across clusters of edge devices, in accordance with example implementations of this disclosure.

At 802, a computer system receives a manifest file including multiple context requirements of a workload, where the multiple context requirements include multiple runtime SLA requirements of the workload.

At 804, the computer system receives telemetry data from multiple SD-WAN edge devices, where the telemetry data includes respective context data of each of the multiple SD-WAN edge devices.

At 806, the computer system selects, based on the telemetry data and the multiple context requirements of the workload, a SD-WAN edge device from the multiple SD-WAN edge devices for placing the workload on the selected SD-WAN edge device, where the context data of the selected SD-WAN edge device meets the multiple context requirements of the workload.

At 808, the computer system runs the workload on the selected SD-WAN edge device.

Figure 9:
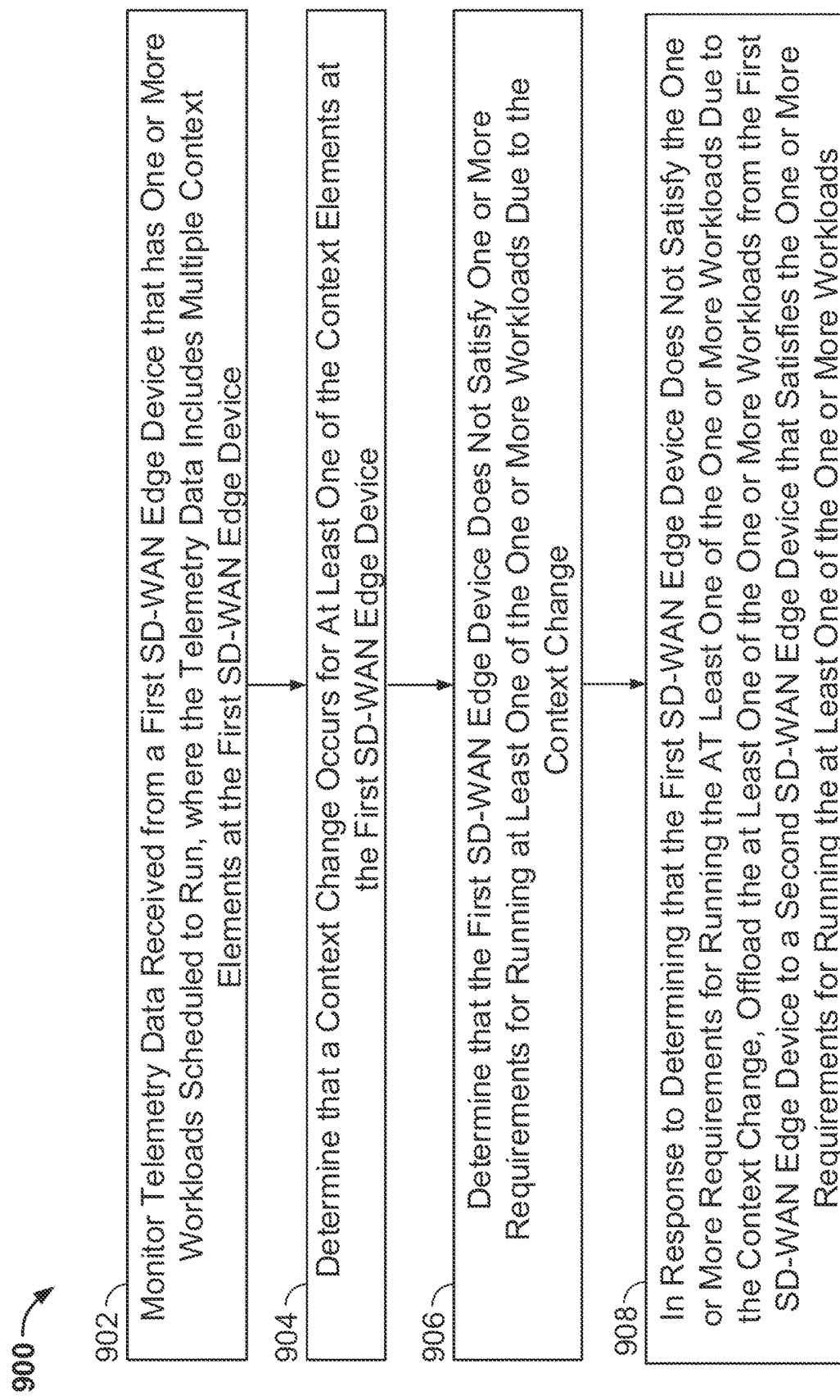
FIG. 9 is a flowchart illustrating an example of a method for remediation of containerized workloads based on context breach at edge devices, in accordance with example implementations of this disclosure.

FIG. 9 illustrates an example of a method 900 for remediation of containerized workloads based on context breach at edge devices, in accordance with example implementations of this disclosure.

At 902, a computer system monitors telemetry data received from a first SD-WAN edge device that has one or more workloads scheduled to run, where the telemetry data includes multiple context elements at the first SD-WAN edge device, and the multiple context elements include multiple runtime SLA elements at the first SD-WAN edge device.

At 904, the computer system determines that a context change occurs for at least one of the context elements at the first SD-WAN edge device.

At 906, the computer system determines that the first SD-WAN edge device does not satisfy one or more requirements for running at least one of the one or more workloads due to the context change.

At 908, in response to determining that the first SD-WAN edge device does not satisfy the one or more requirements for running the at least one of the one or more workloads due to the context change, the computer system offload the at least one of the one or more workloads from the first SD-WAN edge device to a second SD-WAN edge device that satisfies the one or more requirements for running the at least one of the one or more workloads.

Figure 10:
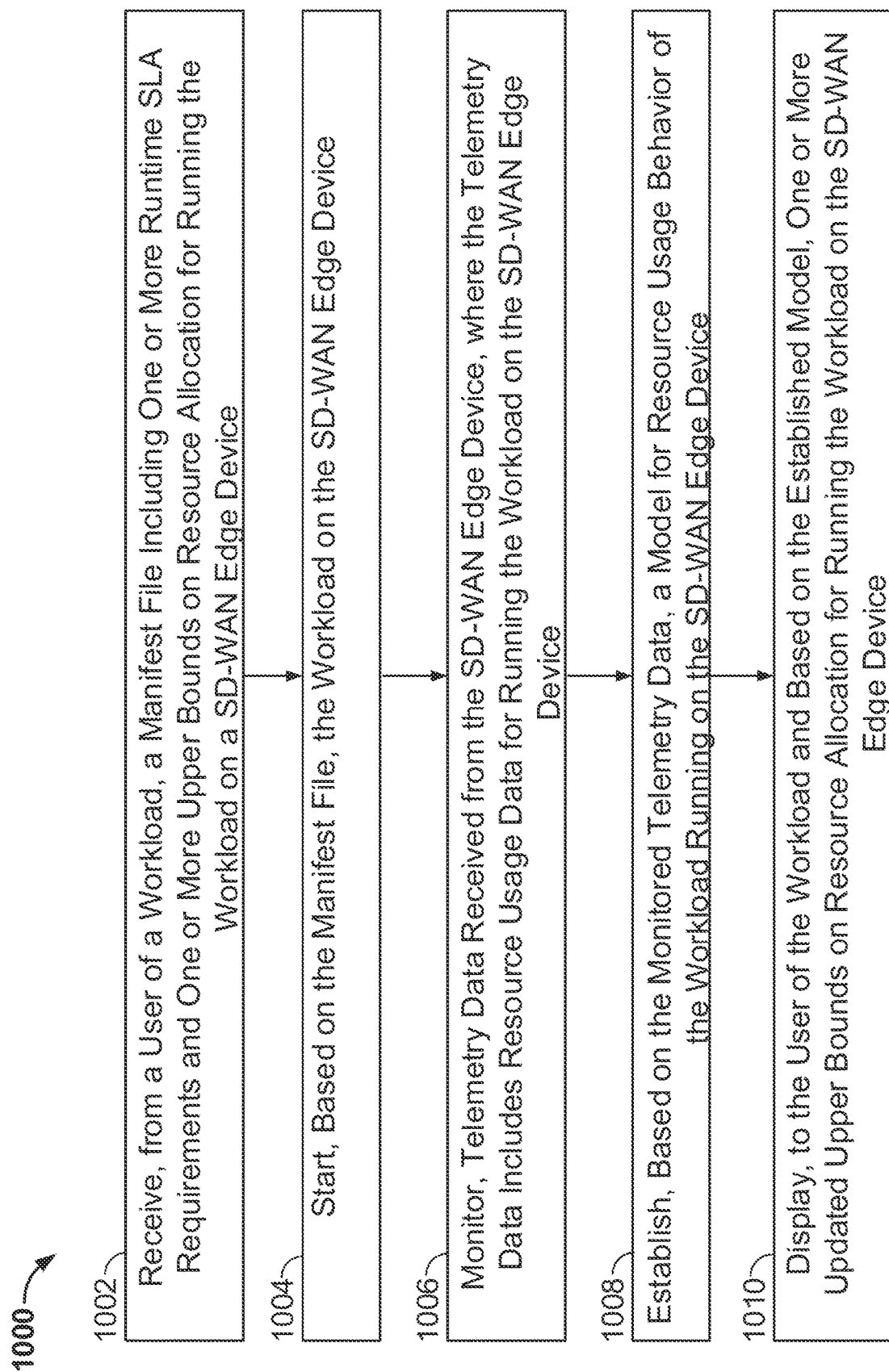
FIG. 10 is a flowchart illustrating an example of a method for right-sizing containerized workloads running on edge devices to meet workload service level agreement adaptively, in accordance with example implementations of this disclosure.

FIG. 10 illustrates an example of a method 1000 for right-sizing containerized workloads running on edge devices to meet workload service level agreement adaptively, in accordance with example implementations of this disclosure.

At 1002, a computer system receives, from a user of a workload, a manifest file including one or more runtime SLA requirements and one or more upper bounds on resource allocation for running the workload on a SD-WAN edge device.

At 1004, the computer system starts, based on the manifest file, the workload on the SD-WAN edge device.

At 1006, the computer system monitors, telemetry data received from the SD-WAN edge device, where the telemetry data includes resource usage data for running the workload on the SD-WAN edge device.

At 1008, the computer system establishes, based on the monitored telemetry data, a model for resource usage behavior of the workload running on the SD-WAN edge device.

At 1010, the computer system displays, to the user of the workload and based on the established model, one or more updated upper bounds on resource allocation for running the workload on the SD-WAN edge device.

Figure 11:
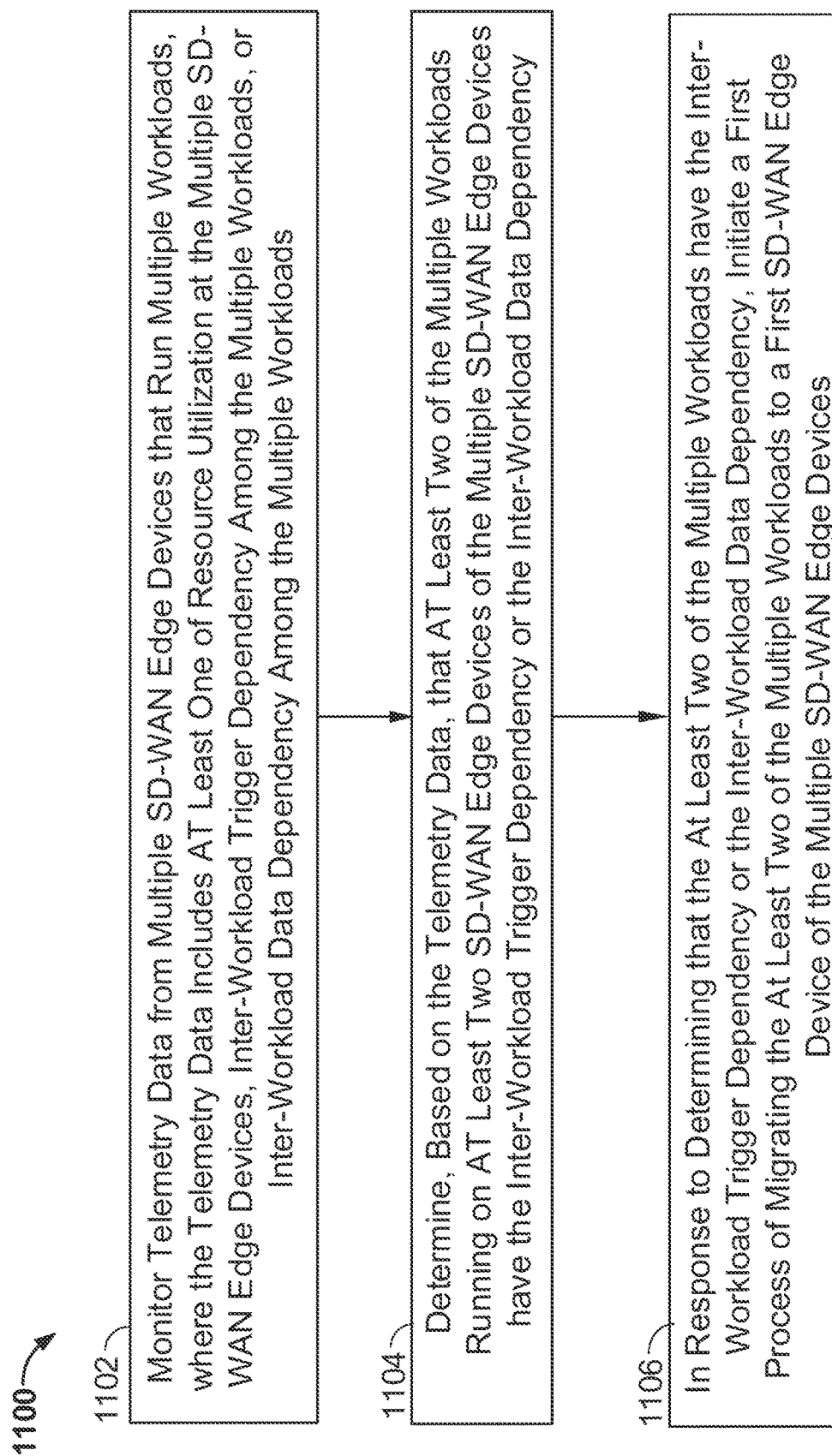
FIG. 11 is a flowchart illustrating an example of a method for context-sensitive defragmentation and aggregation of containerized workloads running on edge devices, in accordance with example implementations of this disclosure.

FIG. 11 illustrates an example of a method 1100 for context-sensitive defragmentation and aggregation of containerized workloads running on edge devices, in accordance with example implementations of this disclosure.

At 1102, a computer system monitors telemetry data from multiple SD-WAN edge devices that run multiple workloads, where the telemetry data includes at least one of resource utilization at the multiple SD-WAN edge devices, inter-workload trigger dependency among the multiple workloads, or inter-workload data dependency among the multiple workloads, the inter-workload trigger dependency includes a dependency between a first pair of workloads of the multiple workloads where one of the first pair of workloads triggers another workload of the first pair of workloads, and the inter-workload data dependency includes a dependency between a second pair of workloads of the multiple workloads where an exit state context of one of the second pair of workloads is ingested by another workload of the second pair of workloads.

At 1104, the computer system determines, based on the telemetry data, that at least two of the multiple workloads running on at least two SD-WAN edge devices of the multiple SD-WAN edge devices have the inter-workload trigger dependency or the inter-workload data dependency.

At 1106, in response to determining that the at least two of the multiple workloads have the inter-workload trigger dependency or the inter-workload data dependency, the computer system initiates a first process of migrating the at least two of the multiple workloads to a first SD-WAN edge device of the multiple SD-WAN edge devices.

Figure 12:
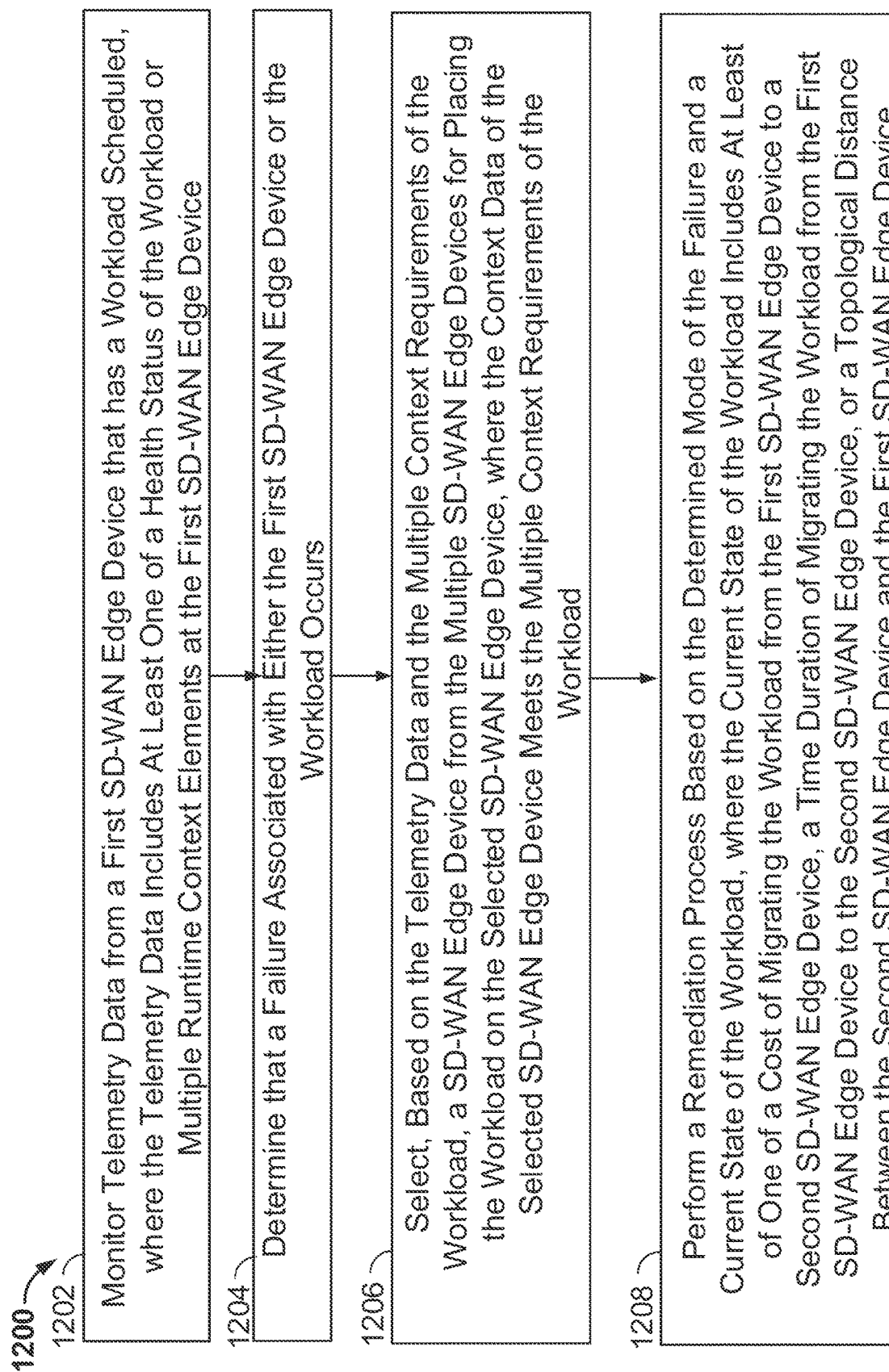
FIG. 12 is a flowchart illustrating an example of a method for inter-cluster automated failover and migration of containerized workloads across edges devices, in accordance with example implementations of this disclosure.

FIG. 12 illustrates an example of a method 1000 for inter-cluster automated failover and migration of containerized workloads across edges devices, in accordance with example implementations of this disclosure.

At 1202, a computer system monitors telemetry data received from a first SD-WAN edge device that has a workload scheduled, where the telemetry data includes at least one of a health status of the workload or multiple runtime context elements at the first SD-WAN edge device, and the multiple runtime context elements include multiple runtime SLA elements at the first SD-WAN edge device.

At 1204, the computer system determines that a failure associated with either the first SD-WAN edge device or the workload occurs.

At 1206, the computer system determines a mode of the failure, where the mode of failure includes at least one of an edge device failure, a storage failure, a network controller failure, a configuration corruption failure, a tampered configuration failure, a system level SLA breach, or a workload SLA breach.

At 1208, the computer system performs a remediation process based on the determined mode of the failure and a current state of the workload, where the current state of the workload includes at least of one of a cost of migrating the workload from the first SD-WAN edge device to a second SD-WAN edge device, a time duration of migrating the workload from the first SD-WAN edge device to the second SD-WAN edge device, or a topological distance between the second SD-WAN edge device and the first SD-WAN edge device.

Figure 13:
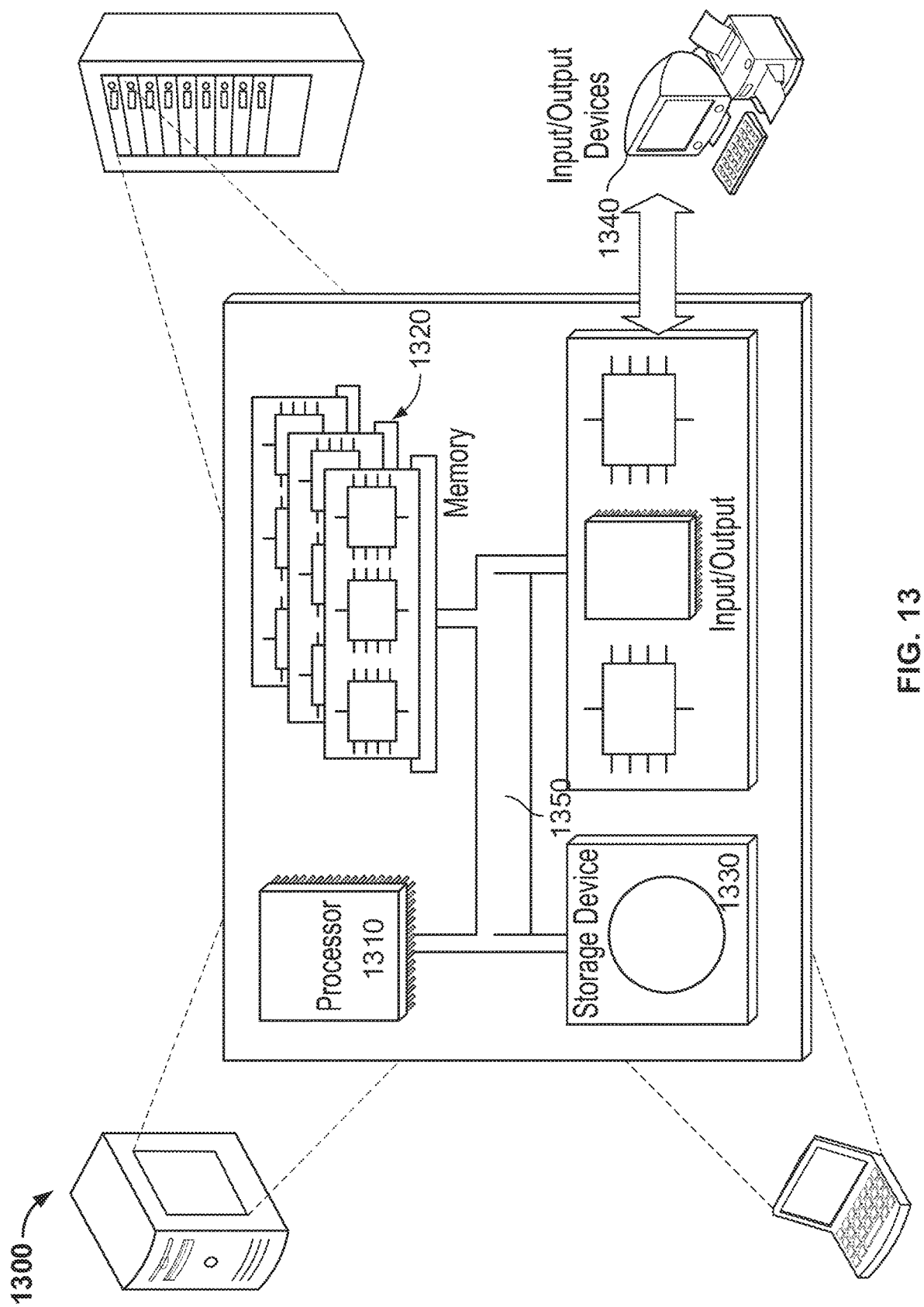
FIG. 13 is a schematic illustration of example computer systems that can be used to execute implementations of the present disclosure.

FIG. 13 illustrates a schematic diagram of an example computing system 1300. The system 1300 can be used for the operations described in association with the implementations described herein. For example, the system 1300 may be included in any or all of the server components discussed herein. The system 1300 includes a processor 1310, a memory 1320, a storage device 1330, and an input/output device 1340. The components 1310, 1320, 1330, and 1340 are interconnected using a system bus 1350. The processor 1310 is capable of processing instructions for execution within the system 1300. In some implementations, the processor 1310 is a single-threaded processor. The processor 1310 is a multi-threaded processor. The processor 1310 is capable of processing instructions stored in the memory 1320 or on the storage device 1330 to display graphical information for a user interface on the input/output device 1340.

The memory 1320 stores information within the system 1300. In some implementations, the memory 1320 is a computer-readable medium. The memory 1320 is a volatile memory unit. The memory 1320 is a non-volatile memory unit. The storage device 1330 is capable of providing mass storage for the system 1300. The storage device 1330 is a computer-readable medium. The storage device 1330 may be a floppy disk device, a hard disk device, an optical disk device, or a tape device. The input/output device 1340 provides input/output operations for the system 1300. The input/output device 1340 includes a keyboard and/or pointing device. The input/output device 1340 includes a display unit for displaying graphical user interfaces.

Certain aspects of the subject matter described here can be implemented as a method. Telemetry data from multiple SD-WAN edge devices that run multiple workloads is monitored, where the telemetry data includes at least one of resource utilization at the multiple SD-WAN edge devices, inter-workload trigger dependency among the multiple workloads, or inter-workload data dependency among the multiple workloads, where the inter-workload trigger dependency includes a dependency between a first pair of workloads of the multiple workloads where one of the first pair of workloads triggers another workload of the first pair of workloads, and the inter-workload data dependency includes a dependency between a second pair of workloads of the multiple workloads where an exit state context of one of the second pair of workloads is ingested by another workload of the second pair of workloads. It is determined, based on the telemetry data, that at least two of the multiple workloads running on at least two SD-WAN edge devices of the multiple SD-WAN edge devices have the inter-workload trigger dependency or the inter-workload data dependency. In response to the determination that the at least two of the multiple workloads have the inter-workload trigger dependency or the inter-workload data dependency, a first process of migrating the at least two of the multiple workloads to a first SD-WAN edge device of the multiple SD-WAN edge devices is initiated.

An aspect taken alone or combinable with any other aspect includes the following features. It is determined, based on the telemetry data, that a second SD-WAN edge device of the multiple SD-WAN edge devices is under-utilized. In response to the determination that the second SD-WAN edge device is under-utilized, a second process of migrating workloads running on the second SD-WAN edge device to a third SD-WAN edge device of the plurality of SD-WAN edge devices is initiated.

An aspect taken alone or combinable with any other aspect includes the following features. After the second process of migrating the workloads running on the second SD-WAN edge device to the third SD-WAN edge device is initiated, the second SD-WAN edge device is marked as un-schedulable. The second SD-WAN edge device is scrubbed. The second SD-WAN edge device is marked for reprovisioning to another tenant.

An aspect taken alone or combinable with any other aspect includes the following features. After the second process of migrating the workloads running on the second SD-WAN edge device to the third SD-WAN edge device is initiated, it is determined that the second process of migrating the workloads running on the second SD-WAN edge device to the third SD-WAN edge device fails. In response to the determination that the second process of migrating the workloads running on the second SD-WAN edge device to the third SD-WAN edge device fails, the second process of migrating the workloads running on the second SD-WAN edge device to the third SD-WAN edge device is canceled.

An aspect taken alone or combinable with any other aspect includes the following features. Determining that the at least two of the multiple workloads running on the at least two SD-WAN edge devices have the inter-workload trigger dependency includes determining that one of the at least two of the multiple workloads triggers another workload of the at least two of the multiple workloads.

An aspect taken alone or combinable with any other aspect includes the following features. Determining that the at least two of the multiple workloads running on the at least two SD-WAN edge devices have the inter-workload data dependency includes determining that an exit state context of one of the at least two of the multiple workloads is ingested by another workload of the at least two of the multiple workloads.

An aspect taken alone or combinable with any other aspect includes the following features. The multiple workloads are containerized workloads orchestrated by a container orchestration platform.

Certain aspects of the subject matter described in this disclosure can be implemented as a non-transitory computer-readable medium storing instructions which, when executed by a hardware-based processor perform operations including the methods described here.

Certain aspects of the subject matter described in this disclosure can be implemented as a computer-implemented system that includes one or more processors including a hardware-based processor, and a memory storage including a non-transitory computer-readable medium storing instructions which, when executed by the one or more processors performs operations including the methods described here.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method operations can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a cathode ray tube (CRT) or liquid crystal display (LCD) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other operations may be provided, or operations may be eliminated, from the described flows, and other components may be added to, or removed from, the described systems. Accordingly, other implementations are within the scope of the following claims.

The preceding figures and accompanying description illustrate example processes and computer-implementable techniques. But system 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the operations in these processes may take place simultaneously, concurrently, and/or in different orders than as shown. Moreover, system 100 may use processes with additional operations, fewer operations, and/or different operations, so long as the methods remain appropriate.

In other words, although this disclosure has been described in terms of certain implementations and generally associated methods, alterations and permutations of these implementations and methods will be apparent to those skilled in the art. Accordingly, the above description of example implementations does not define or constrain this disclosure. Other changes, substitutions, and alterations are also possible without departing from the spirit and scope of this disclosure.

What is claimed is:

1. A computer-implemented method, comprising:
    monitoring telemetry data from a plurality of software defined wide area network (SD-WAN) edge devices that run a plurality of workloads, wherein the telemetry data comprises at least one of resource utilization at the plurality of SD-WAN edge devices, inter-workload trigger dependency among the plurality of workloads, or inter-workload data dependency among the plurality of workloads, wherein the inter-workload trigger dependency comprises a dependency between a first pair of workloads of the plurality of workloads where one of the first pair of workloads triggers another workload of the first pair of workloads, and wherein the inter-workload data dependency comprises a dependency between a second pair of workloads of the plurality of workloads where an exit state context of one of the second pair of workloads is ingested by another workload of the second pair of workloads;
    determining, based on the telemetry data, that at least two of the plurality of workloads running on at least two SD-WAN edge devices of the plurality of SD-WAN edge devices have the inter-workload trigger dependency or the inter-workload data dependency; and
    in response to determining that the at least two of the plurality of workloads have the inter-workload trigger dependency or the inter-workload data dependency, initiating a first process of migrating the at least two of the plurality of workloads to a first SD-WAN edge device of the plurality of SD-WAN edge devices.

2. The computer-implemented method according to claim 1, wherein the computer-implemented method further comprises:
    determining, based on the telemetry data, that a second SD-WAN edge device of the plurality of SD-WAN edge devices is under-utilized; and
    in response to determining that the second SD-WAN edge device is under-utilized, initiating a second process of migrating workloads running on the second SD-WAN edge device to a third SD-WAN edge device of the plurality of SD-WAN edge devices.

3. The computer-implemented method according to claim 2, wherein after initiating the second process of migrating the workloads running on the second SD-WAN edge device to the third SD-WAN edge device, the method further comprises:
    marking the second SD-WAN edge device as un-schedulable;
    scrubbing the second SD-WAN edge device; and
    marking the second SD-WAN edge device for reprovisioning to another tenant.

4. The computer-implemented method according to claim 2, wherein after initiating the second process of migrating the workloads running on the second SD-WAN edge device to the third SD-WAN edge device, the method further comprises:
    determining that the second process of migrating the workloads running on the second SD-WAN edge device to the third SD-WAN edge device fails; and
    in response to determining that the second process of migrating the workloads running on the second SD-WAN edge device to the third SD-WAN edge device fails, canceling the second process of migrating the workloads running on the second SD-WAN edge device to the third SD-WAN edge device.

5. The computer-implemented method according to claim 1, wherein determining that the at least two of the plurality of workloads running on the at least two SD-WAN edge devices have the inter-workload trigger dependency comprises determining that one of the at least two of the plurality of workloads triggers another workload of the at least two of the plurality of workloads.

6. The computer-implemented method according to claim 1, wherein determining that the at least two of the plurality of workloads running on the at least two SD-WAN edge devices have the inter-workload data dependency comprises determining that an exit state context of one of the at least two of the plurality of workloads is ingested by another workload of the at least two of the plurality of workloads.

7. The computer-implemented method according to claim 1, wherein the plurality of workloads are containerized workloads orchestrated by a container orchestration platform.

8. A non-transitory, computer-readable medium storing one or more instructions executable by a computer system to perform operations, the operations comprise:

monitoring telemetry data from a plurality of software defined wide area network (SD-WAN) edge devices that run a plurality of workloads, wherein the telemetry data comprises at least one of resource utilization at the plurality of SD-WAN edge devices, inter-workload trigger dependency among the plurality of workloads, or inter-workload data dependency among the plurality of workloads, wherein the inter-workload trigger dependency comprises a dependency between a first pair of workloads of the plurality of workloads where one of the first pair of workloads triggers another workload of the first pair of workloads, and wherein the inter-workload data dependency comprises a dependency between a second pair of workloads of the plurality of workloads where an exit state context of one of the second pair of workloads is ingested by another workload of the second pair of workloads;

determining, based on the telemetry data, that at least two of the plurality of workloads running on at least two SD-WAN edge devices of the plurality of SD-WAN edge devices have the inter-workload trigger dependency or the inter-workload data dependency; and in response to determining that the at least two of the plurality of workloads have the inter-workload trigger dependency or the inter-workload data dependency, initiating a first process of migrating the at least two of the plurality of workloads to a first SD-WAN edge device of the plurality of SD-WAN edge devices.

9. The non-transitory, computer-readable medium according to claim 8, wherein the computer-implemented method further comprises:

determining, based on the telemetry data, that a second SD-WAN edge device of the plurality of SD-WAN edge devices is under-utilized; and in response to determining that the second SD-WAN edge device is under-utilized, initiating a second process of migrating workloads running on the second SD-WAN edge device to a third SD-WAN edge device of the plurality of SD-WAN edge devices.

10. The non-transitory, computer-readable medium according to claim 9, wherein after initiating the second process of migrating the workloads running on the second SD-WAN edge device to the third SD-WAN edge device, the method further comprises:

marking the second SD-WAN edge device as un-schedulable;

scrubbing the second SD-WAN edge device; and marking the second SD-WAN edge device for reprovisioning to another tenant.

11. The non-transitory, computer-readable medium according to claim 9, wherein after initiating the second process of migrating the workloads running on the second SD-WAN edge device to the third SD-WAN edge device, the method further comprises:

determining that the second process of migrating the workloads running on the second SD-WAN edge device to the third SD-WAN edge device fails; and in response to determining that the second process of migrating the workloads running on the second SD-WAN edge device to the third SD-WAN edge device fails, canceling the second process of migrating the workloads running on the second SD-WAN edge device to the third SD-WAN edge device.

12. The non-transitory, computer-readable medium according to claim 8, wherein determining that the at least two of the plurality of workloads running on the at least two SD-WAN edge devices have the inter-workload trigger dependency comprises determining that one of the at least two of the plurality of workloads triggers another workload of the at least two of the plurality of workloads.

13. The non-transitory, computer-readable medium according to claim 8, wherein determining that the at least two of the plurality of workloads running on the at least two SD-WAN edge devices have the inter-workload data dependency comprises determining that an exit state context of one of the at least two of the plurality of workloads is ingested by another workload of the at least two of the plurality of workloads.

14. The non-transitory, computer-readable medium according to claim 8, wherein the plurality of workloads are containerized workloads orchestrated by a container orchestration platform.

15. A computer-implemented system, comprising:

one or more computers; and one or more computer memory devices interoperably coupled with the one or more computers and having tangible, non-transitory, machine-readable media storing one or more instructions that, when executed by the one or more computers, perform one or more operations, the one or more operations comprising:

monitoring telemetry data from a plurality of software defined wide area network (SD-WAN) edge devices that run a plurality of workloads, wherein the telemetry data comprises at least one of resource utilization at the plurality of SD-WAN edge devices, inter-workload trigger dependency among the plurality of workloads, or inter-workload data dependency among the plurality of workloads, wherein the inter-workload trigger dependency comprises a dependency between a first pair of workloads of the plurality of workloads where one of the first pair of workloads triggers another workload of the first pair of workloads, and wherein the inter-workload data dependency comprises a dependency between a second pair of workloads of the plurality of workloads where an exit state context of one of the second pair of workloads is ingested by another workload of the second pair of workloads;

determining, based on the telemetry data, that at least two of the plurality of workloads running on at least two SD-WAN edge devices of the plurality of SD-WAN edge devices have the inter-workload trigger dependency or the inter-workload data dependency; and in response to determining that the at least two of the plurality of workloads have the inter-workload trigger dependency or the inter-workload data dependency, initiating a first process of migrating the at least two of the plurality of workloads to a first SD-WAN edge device of the plurality of SD-WAN edge devices.

16. The computer-implemented system according to claim 15, wherein the one or more operations further comprises:

determining, based on the telemetry data, that a second SD-WAN edge device of the plurality of SD-WAN edge devices is under-utilized; and in response to determining that the second SD-WAN edge device is under-utilized, initiating a second process of migrating workloads running on the second SD-WAN edge device to a third SD-WAN edge device of the plurality of SD-WAN edge devices.

17. The computer-implemented system according to claim 16, wherein after initiating the second process of migrating the workloads running on the second SD-WAN edge device to the third SD-WAN edge device, the one or more operations further comprise:
marking the second SD-WAN edge device as un-schedulable;
scrubbing the second SD-WAN edge device; and
marking the second SD-WAN edge device for reprovisioning to another tenant.

18. The computer-implemented system according to claim 16, wherein after initiating the second process of migrating the workloads running on the second SD-WAN edge device to the third SD-WAN edge device, the one or more operations further comprise:
determining that the second process of migrating the workloads running on the second SD-WAN edge device to the third SD-WAN edge device fails; and
in response to determining that the second process of migrating the workloads running on the second SD-WAN edge device to the third SD-WAN edge device fails, canceling the second process of migrating the workloads running on the second SD-WAN edge device to the third SD-WAN edge device.

19. The computer-implemented system according to claim 15, wherein determining that the at least two of the plurality of workloads running on the at least two SD-WAN edge devices have the inter-workload trigger dependency comprises determining that one of the at least two of the plurality of workloads triggers another workload of the at least two of the plurality of workloads.

20. The computer-implemented system according to claim 15, wherein determining that the at least two of the plurality of workloads running on the at least two SD-WAN edge devices have the inter-workload data dependency comprises determining that an exit state context of one of the at least two of the plurality of workloads is ingested by another workload of the at least two of the plurality of workloads.

* * * * *